United States Patent
Berry et al.

(10) Patent No.: US 6,539,339 B1
(45) Date of Patent: Mar. 25, 2003

(54) METHOD AND SYSTEM FOR MAINTAINING THREAD-RELATIVE METRICS FOR TRACE DATA ADJUSTED FOR THREAD SWITCHES

(75) Inventors: Robert Francis Berry, Austin, TX (US); Ronald O'Neal Edmark, Austin, TX (US); Frank Eliot Levine, Austin, TX (US); Robert J. Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/393,087

(22) Filed: Sep. 9, 1999

Related U.S. Application Data

(63) Continuation-in-part of application No. 09/343,439, filed on Jun. 30, 1999, and a continuation-in-part of application No. 09/343,438, filed on Jun. 30, 1999, and a continuation-in-part of application No. 09/177,031, filed on Oct. 22, 1998, now Pat. No. 6,311,325, and a continuation-in-part of application No. 09/052,329, filed on Mar. 31, 1998, now Pat. No. 6,002,872, and a continuation-in-part of application No. 08/989,725, filed on Dec. 12, 1997, now Pat. No. 6,055,492.

(51) Int. Cl.$^7$ ................................................ G06F 11/00
(52) U.S. Cl. .................... 702/186; 702/183; 702/182; 702/187; 714/38; 717/130
(58) Field of Search .................. 702/182–188, 702/119, 122, 123, 176–179, FOR 103, FOR 104, FOR 134, FOR 135, FOR 139, FOR 170, FOR 171; 714/38, 45; 717/128, 130, 124, 126, 127, 131, 132, 133, 116; 712/244

(56) References Cited

U.S. PATENT DOCUMENTS 4,558,413 A    12/1985   Schmidt et al. ............. 364/300
5,295,230 A    3/1994    Kung ............................ 395/75
5,321,834 A    6/1994    Weiser et al. ................ 395/600

(List continued on next page.)

FOREIGN PATENT DOCUMENTS

| JP | 02191017 | 10/1990 | |
| JP | 4131921  | 8/1992  | ............. G06F/3/02 |
| JP | 10083326 | 5/1996  | ........... G06F/11/28 |

OTHER PUBLICATIONS

Waldron, "Dyanamic Bytecode Usage by Object Oriented Java Programs", IEEE, 1999, pp. 1–10.*

International Business Machines Corporation; Technical Disclosure Bulletin vol. 38, No. 11, Nov. 1995; Implementation of High Performance Subtype Object Migration, pp. 311–314.

(List continued on next page.)

Primary Examiner—Hal Wachsman
(74) Attorney, Agent, or Firm—Duke W. Yee; Leslie A. VanLeeuwen; Michael R. Nichols

(57) ABSTRACT

A method and system for maintaining a thread-relative metric for trace data using device driver support is provided. A profiling process may detect a current event, and in response to the current event, may request an elapsed metric since a preceding event. The profiling process then receives a thread-relative elapsed metric and may output a trace record for the current event in which is stored a metric equal to the received thread-relative elapsed metric. In response to a notification of an occurrence of the current event, a device driver computes the thread-relative elapsed metric by: determining a current thread; retrieving a stored metric for the preceding event of the current thread; obtaining a current metric; and computing the thread-relative elapsed metric as a difference between the current metric and the stored metric.

7 Claims, 19 Drawing Sheets

U.S. PATENT DOCUMENTS

| | | | |
|---|---|---|---|
| 5,465,258 A | 11/1995 | Adams | 395/700 |
| 5,481,712 A | 1/1996 | Silver et al. | 395/700 |
| 5,485,616 A | 1/1996 | Burke et al. | 395/700 |
| 5,493,689 A | 2/1996 | Waclawsky et al. | 395/821 |
| 5,506,955 A | 4/1996 | Chen et al. | 395/183.02 |
| 5,539,907 A | 7/1996 | Srivastava et al. | 395/700 |
| 5,553,235 A | 9/1996 | Chen et al. | 395/182.18 |
| 5,649,085 A | 7/1997 | Lehr | 395/140 |
| 5,689,712 A | 11/1997 | Heisch | 395/704 |
| 5,696,701 A * | 12/1997 | Burgess et al. | 702/186 |
| 5,732,273 A | 3/1998 | Srivastava et al. | 395/704 |
| 5,737,609 A | 4/1998 | Reed et al. | 395/704 |
| 5,748,878 A | 5/1998 | Rees et al. | 395/183.14 |
| 5,768,500 A | 6/1998 | Agrawal et al. | 395/184.01 |
| 5,838,976 A * | 11/1998 | Summers | 717/130 |
| 5,923,872 A * | 7/1999 | Chrysos et al. | 712/244 |
| 6,016,466 A * | 1/2000 | Guinther et al. | 702/187 |
| 6,081,665 A * | 6/2000 | Nilsen et al. | 717/116 |
| 6,098,169 A * | 8/2000 | Ranganathan | 714/38 |
| 6,256,775 B1 * | 7/2001 | Flynn | 717/130 |
| 6,279,124 B1 * | 8/2001 | Brouwer et al. | 714/38 |

OTHER PUBLICATIONS

International Business Machines Corporation; Technical Disclosure Bulletin vol. 21, No. 11, Apr. 1979; Method For Correlating Graphical Data On An Interactive Display, pp. 4658,4659.

Morrisett et al.; Abstract Models of Memory Management; Jun. 1995; pp. 66–77.

Reilly, M; Presentation Tools for Performance Visualization: the M31 Instrumentation Experience; Jan. 1990; pp 307–313.

Rich, SH et al.; Model–based Reasoning in Diagnostic Expert Systems for Chemical Process Plants; 1987; pp 111–122. (No month).

Three Form Editing; No. 30363; Jul. 1989, 1 page.

A Technique for Sharing Data Among Elements of a Hierarchic Document; No. 28983; May 1988, 1 page.

* cited by examiner

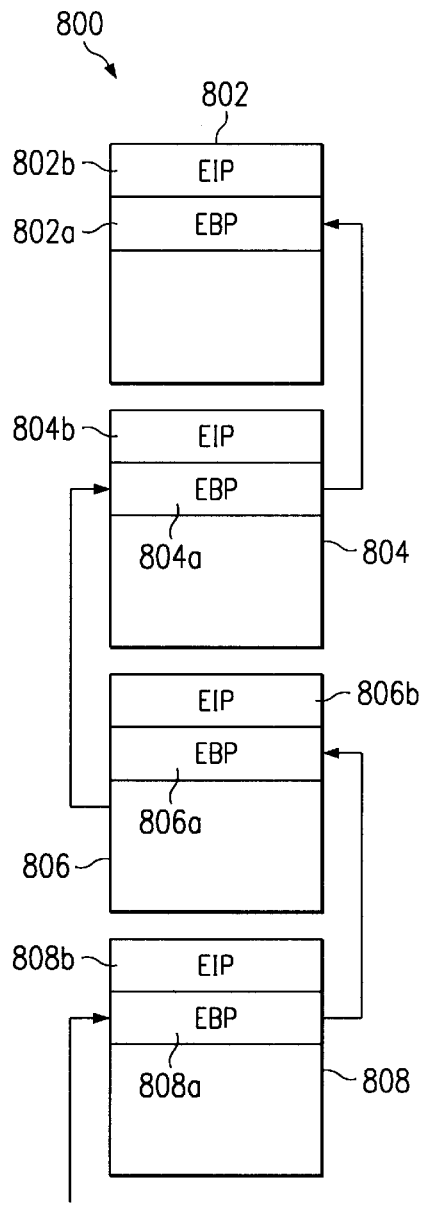
| TIMESTAMP | EVENT | CALL STACK AFTER EVENT |
|---|---|---|
| 0 | ENTER C | C |
| 1 | ENTER A | CA |
| 2 | ENTER B | CAB |
| 3 | EXIT FROM B | CA |
| 4 | ENTER B | CAB |
| 5 | ENTER B | CABB |
| 6 | EXIT FROM B | CAB |
| 7 | EXIT FROM B | CA |
| 8 | EXIT FROM A | C |
| 9 | ENTER B | CB |
| 10 | ENTER A | CBA |
| 11 | ENTER B | CBAB |
| 12 | ENTER A | CBABA |
| 13 | EXIT FROM A | CBAB |
| 14 | EXIT FROM B | CBA |
| 15 | ENTER X | CBAX |
| 16 | EXIT FROM X | CBA |
| 17 | EXIT FROM A | CB |
| 18 | EXIT FROM B | C |
| 19 | EXIT FROM C |  |
POINTER TO TOP OF CURRENT STACK FRAME FOR INTERRUPTED THREAD
*FIG. 8*
*FIG. 10A*
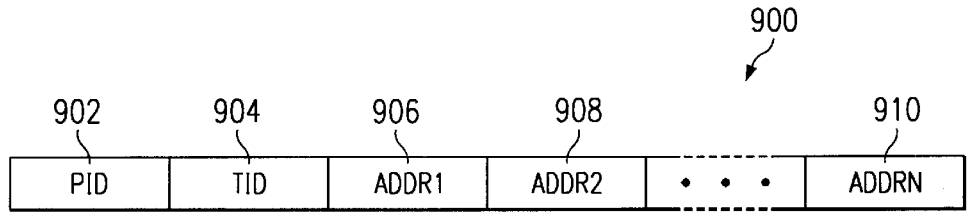
*FIG. 9*

| SAMPLE | CALL STACK AT SAMPLE |
|---|---|
| 1 | C |
| 2 | CAB |
| 3 | CAB |
| 4 | CAB |
| 5 | C |
| 6 | CBA |
| 7 | CBABA |
| 8 | CBA |
| 9 | CBA |
| 10 | C |
*FIG. 10B*
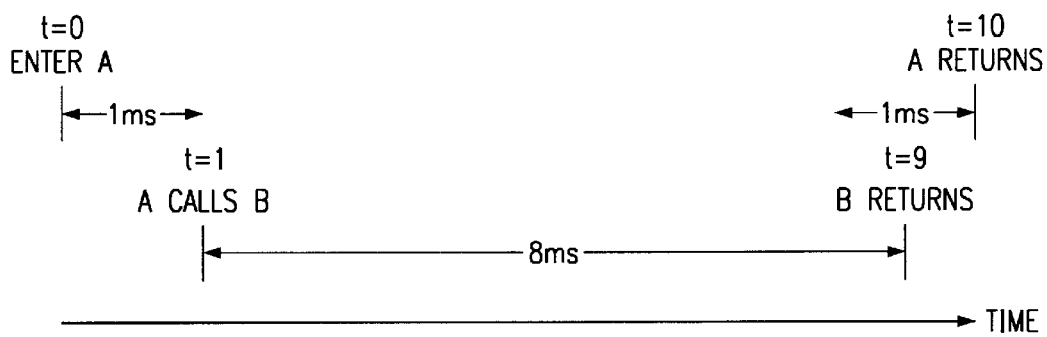
*FIG. 10C*
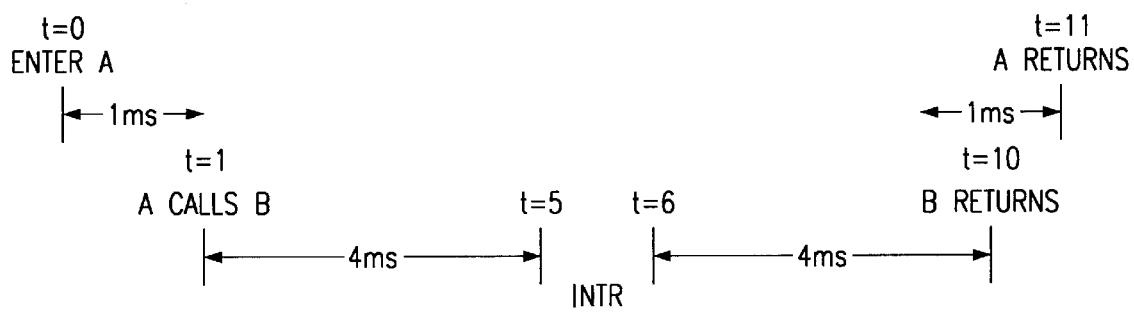
*FIG. 10D*

| LEVEL | RL | CALLS | BASE | CUM | INDENT |
|---|---|---|---|---|---|
| 0 | 1 | 1 | 0 | 19 | pt_pidtid |
| 1 | 1 | 1 | 3 | 19 | -C |
| 2 | 1 | 1 | 3 | 7 | --A |
| 3 | 1 | 2 | 3 | 4 | ---B |
| 4 | 2 | 1 | 1 | 1 | ----B |
| 2 | 1 | 1 | 2 | 9 | --B |
| 3 | 1 | 1 | 3 | 7 | ---A |
| 4 | 2 | 1 | 2 | 3 | ----B |
| 5 | 2 | 1 | 1 | 1 | -----A |
| 4 | 1 | 1 | 1 | 1 | ----X |

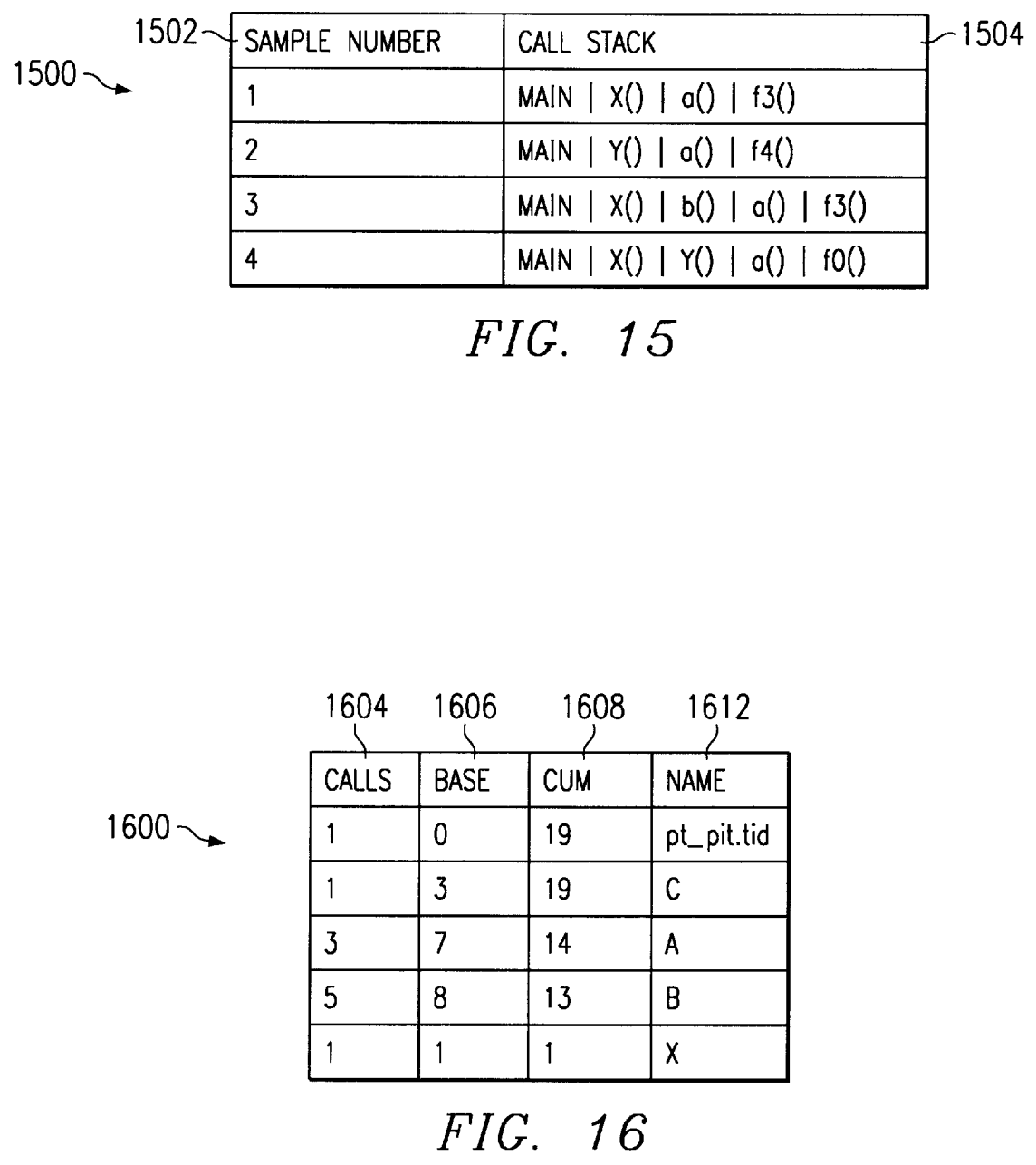

| SAMPLE NUMBER | CALL STACK |
|---|---|
| 1 | MAIN \| X() \| a() \| f3() |
| 2 | MAIN \| Y() \| a() \| f4() |
| 3 | MAIN \| X() \| b() \| a() \| f3() |
| 4 | MAIN \| X() \| Y() \| a() \| f0() |

*FIG. 15*

| CALLS | BASE | CUM | NAME |
|---|---|---|---|
| 1 | 0 | 19 | pt_pit.tid |
| 1 | 3 | 19 | C |
| 3 | 7 | 14 | A |
| 5 | 8 | 13 | B |
| 1 | 1 | 1 | X |

*FIG. 16*

ArcFlow OUTPUT
  BASE - TIME/INSTRUCTIONS DIRECTLY IN FUNCTION
  CUM  - TIME/INSTRUCTIONS DIRECTLY AND INDIRECTLY IN FUNCTION ArcFlow INVARIENTS:
  1) Sum(Parent(Calls)) = Self(Calls)
  2) Sum(Parent(Base))  = Self(Base)
  3) Sum(Parent(Cum))   = Self(Cum)
  4) Sum(Child(Cum))    = Self(Cum) - Self(Base)

| SOURCE | CALLS | BASE | CUM | FUNCTION |
|---|---|---|---|---|
| SELF | 1 | 0 | 19 | [0] pt_pidtid |
| CHILD | 1 | 3 | 19 | C |
| PARENT | 1 | 3 | 19 | pt_pidtid |
| SELF | 1 | 3 | 19 | [1] C |
| CHILD | 1 | 2 | 9 | B |
| CHILD | 1 | 3 | 7 | A |
| PARENT | 1 | 3 | 7 | C |
| PARENT | 1 | 3 | 7 | B |
| rPARENT | 1 | 1 | 1 | B |
| SELF | 3 | 7 | 14 15 | [2] A |
| CHILD | 3 | 5 | 7 | B |
| CHILD | 1 | 1 | 1 | X |
| PARENT | 2 | 3 | 4 | A |
| rPARENT | 1 | 2 | 3 | A |
| PARENT | 1 | 2 | 9 | C |
| SELF | 5 | 8 | 13 17 | [3] B |
| CHILD | 1 | 3 | 7 | A |
| rCHILD | 1 | 1 | 1 | A |
| CHILD | 1 | 1 | 1 | B |
| PARENT | 1 | 1 | 1 | A |
| SELF | 1 | 1 | 1 | [4] X |

UNITS : : TICKS
TOTAL : : 342

| LvL | RL | CALLS | BASE | CUM | INDENT NAME |
|---|---|---|---|---|---|
| 1 | 1 | 1 | 0 | 342 | - _Thread-21__(0xe0046618) |
| 2 | 1 | 3 | 0 | 342 | -- J:nulltestScore()l |
| 3 | 1 | 2 | 0 | 272 | --- J:nulltestMilliseconds(I)l |
| 4 | 1 | 29450 | 0 | 271 | ---- J:nullexecute()l |
| 5 | 1 | 271 | 0 | 271 | ----+ stack_0x40 ~1802 |
| 6 | 1 | 271 | 0 | 271 | -----+ F:ExecuteJava |
| 7 | 1 | 271 | 0 | 271 | ------+ F:_jit_invokeCompiledEntryMethod |
| 8 | 1 | 271 | 0 | 271 | -------+ F:_jit_invokeentry |
| 9 | 1 | 271 | 0 | 271 | --------+ F:_JITInvokeCompiledEntryMethod_md |
| 10 | 1 | 271 | 0 | 271 | ---------+ J:nullrun()v |
| 11 | 2 | 271 | 0 | 271 | ----------+ J:nulltestScore()l |
| 12 | 2 | 271 | 0 | 271 | -----------+ J:nulltestMilliseconds(I)l |
| 13 | 2 | 271 | 268 | 271 | ------------+ J:nullexecute()l |
| 14 | 1 | 2 | 0 | 2 | -------------+ F:jperf_methodEntry |
| 15 | 1 | 2 | 0 | 2 | --------------+ F:SoftTracehook |
| 16 | 1 | 2 | 2 | 2 | ---------------+ F:enable_interrupts |
| 14 | 1 | 1 | 0 | 1 | -------------+ F:jperf_methodExit |
| 4 | 1 | 1 | 0 | 1 | ---- stack_0x40 ~1804 |
| 5 | 1 | 1 | 0 | 1 | -----+ F:ExecuteJava |
| 6 | 1 | 1 | 0 | 1 | ------+ F:_jit_invokeCompiledEntryMethod |
| 7 | 1 | 1 | 0 | 1 | -------+ F:_jitinvokeentry |
| 8 | 1 | 1 | 0 | 1 | --------+ F:JITInvokeCompiledEntryMethod_md |
| 9 | 1 | 1 | 0 | 1 | ---------+ J:nullrun()v |
| 10 | 2 | 1 | 0 | 1 | ----------+ J:nulltestScore()l |
| 11 | 2 | 1 | 0 | 1 | -----------+ J:nulltestMilliseconds(I)l |
| 12 | 1 | 1 | 0 | 1 | ------------+ J:nullexecute()l |
| 13 | 1 | 1 | 0 | 1 | -------------+ F:jperf_methodExit |
| 14 | 1 | 1 | 0 | 1 | --------------+ F:SoftTracehook |
| 15 | 1 | 1 | 1 | 1 | ---------------+ F:enable_interrupts |
| 4 | 1 | 2 | 0 | 0 | ---- J:nullcleanUp()l |

1800, 1802, 1804, 1806, 1808

| MAJOR CODE | MINOR CODE | DATA ITEM 1 | DATA ITEM 2 | DATA ITEM 3 | DATA ITEM 4 | DATA ITEM 5 | DESCRIPTION |
|---|---|---|---|---|---|---|---|
| 0x4 | LEVEL + 0x1 | DEPTH | N/A | N/A | N/A | | BEGIN INTERRUPT AT LEVEL |
| 0x4 | LEVEL + 0x80000001 | DEPTH | N/A | N/A | N/A | | END INTERRUPT AT LEVEL |
| 0x10 | 0xab | SYSTEM TID | JAVA TID | IS SYSTEM THREAD (BOOLEAN) | N/A | | THREAD CREATED WITHOUT A NAME WHILE TRACE ACTIVE |
| 0x10 | 0xac | SYSTEM TID | N/A | N/A | N/A | | IDENTIFIES THE IDLE THREAD |
| 0x10 | 0xad | SYSTEM TID | N/A | N/A | N/A | | IDENTIFIES THE GARBAGE COLLECTION THREAD |
| 0x10 | 0xae | SYSTEM TID | JAVA TID | THREAD NAME | N/A | | THREAD CREATED WITH A NAME WHILE TRACE ACTIVE |
| 0x30 | 0x10 | OBJECT ID | METHOD BLOCK ADDRESS | N/A | N/A | | METHOD INVOCATION (INTERPRETED) |

FROM FIG. 19A

| | | | | | | |
|---|---|---|---|---|---|---|
| 0x30 | 0x10 + 0x80000000 | OBJECT ID | METHOD BLOCK ADDRESS | N/A | N/A | METHOD EXIT (INTERPRETED) |
| 0x40 | 0x7fffffff | NUMBER (n) OF STACK UNWINDS AT TIMER INTERRUPT | pc1-PROGRAM COUNTER OF INTERRUPTED ROUTINE | pc2-CALLER OF INTERRUPTED ROUTINE | ...... | pcn-1 OF n-2nd CALLER OF INTERRUPTED ROUTINE | pcn OF n-1st CALLER OF INTERRUPTED ROUTINE |
| 0x41 | 0x7fffffff | NUMBER (n) OF STACK UNWINDS AT INSTRUMENTED ROUTINE | pc1-PROGRAM COUNTER OF INSTRUMENTED ROUTINE | pc2-CALLER OF INSTRUMENTED ROUTINE | ...... | | pcn OF n-1st CALLER OF INSTRUMENTED ROUTINE |
| 0x50 | 0x10 | OBJECT ID | METHOD BLOCK ADDRESS | N/A | N/A | METHOD INVOCATION (jitted) |
| 0x50 | 0x10 + 0x80000000 | OBJECT ID | METHOD BLOCK ADDRESS | N/A | N/A | METHOD EXIT (jitted) |

*FIG. 19B*

METHOD AND SYSTEM FOR MAINTAINING THREAD-RELATIVE METRICS FOR TRACE DATA ADJUSTED FOR THREAD SWITCHES

CROSS-REFERENCE TO RELATED APPLICATIONS

This application is a continuation-in-part of the following copending and commonly assigned applications entitled "SYSTEM AND METHOD FOR PROVIDING TRACE INFORMATION REDUCTION", U.S. application Ser. No. 08/989,725, now U.S. Pat. No. 6,055,492; "A METHOD AND APPARATUS FOR STRUCTURED PROFILING OF DATA PROCESSING SYSTEMS AND APPLICATIONS", U.S. application Ser. No. 09/052,329, filed on Mar. 31, 1998, now U.S. Pat. No. 6,002,872; "METHOD AND APPARATUS FOR PROFILING PROCESSES IN A DATA PROCESSING SYSTEM", U.S. application Ser. No. 09/177,031, filed on Oct. 22, 1998, now U.S. Pat. No. 6,311,325; "PROCESS AND SYSTEM FOR MERGING TRACE DATA FOR PRIMARILY INTERPRETED METHODS", U.S. application Ser. No. 09/343,439, currently pending, filed on Jun. 30, 1999; and "METHOD AND SYSTEM FOR MERGING EVENT-BASED DATA AND SAMPLED DATA INTO POSTPROCESSED TRACE OUTPUT", U.S. application Ser. No. 09/343,438, currently pending, filed on Jun. 30, 1999.

The present invention is related to the following applications entitled "METHOD AND SYSTEM FOR COMPENSATING FOR INSTRUMENTATION OVERHEAD IN TRACE DATA BY COMPUTING AVERAGE MINIMUM EVENT TIMES", U.S. application Ser. No. 09/393088, now U.S. Pat. No. 6,349,406, "METHOD AND SYSTEM FOR COMPENSATING FOR OUTPUT OVERHEAD IN TRACE DATA", U.S. application Ser. No. 09/414,344 pending; "METHOD AND SYSTEM FOR COMPENSATING FOR INSTRUMENTATION OVERHEAD IN TRACE, DATA BY DETECTING MINIMUM EVENT TIMES", U.S. application Ser. No. 09/393,086 pending; and "METHOD AND SYSTEM FOR MAINTAINING THREAD-RELATIVE TIME FOR TRACE DATA USING DEVICE DRIVER SUPPORT", U.S. application Ser. No. 09/393,089 pending; all of which are filed even dale hereof, assigned to the same assignee, and incorporated herein by reference. In addition, this application is related to the following application entitled "A METHOD AND APPARATUS FOR STRUCTURED MEMORY ANALYSIS OF DATA PROCESSING SYSTEMS AND APPLICATIONS", U.S. application Ser. No. 09/052,331, filed on Mar. 31, 1998, now U.S. Pat. No. 6,158,024 which is hereby incorporated by reference.

BACKGROUND OF THE INVENTION

1. Technical Field

The present invention relates to an improved data processing system and, in particular, to a method and apparatus for optimizing performance in a data processing system. Still more particularly, the present invention provides a method and apparatus for a software program development tool for enhancing performance of a software program through software profiling.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time. Software performance tools also are useful in data processing systems, such as personal computer systems, which typically do not contain many, if any, built-in hardware performance tools.

One known software performance tool is a trace tool. A trace tool may use more than one technique to provide trace information that indicates execution flows for an executing program. One technique keeps track of particular sequences of instructions by logging certain events as they occur, so-called event-based profiling technique. For example, a trace tool may log every entry into, and every exit from, a module, subroutine, method, function, or system component. Alternately, a trace tool may log the requester and the amounts of memory allocated for each memory allocation request. Typically, a time-stamped record is produced for each such event. Corresponding pairs of records similar to entry-exit records also are used to trace execution of arbitrary code segments, starting and completing I/O or data transmission, and for many other events of interest.

In order to improve performance of code generated by various families of computers, it is often necessary to determine where time is being spent by the processor in executing code, such efforts being commonly known in the computer processing arts as locating "hot spots." Ideally, one would like to isolate such hot spots at the instruction and/or source line of code level in order to focus attention on areas which might benefit most from improvements to the code.

Another trace technique involves program sampling to identify certain locations in programs in which the programs appear to spend large amounts of time. This technique is based on the idea of interrupting the application or data processing system execution at regular intervals, so-called sample-based profiling. At each interruption, the program counter of the currently executing thread, a process that is part of a larger process or program, is recorded. Typically, these tools capture values that are resolved against a load map and symbol table information for the data processing system at post-processing time, and a profile of where the time is being spent is obtained from this analysis.

For example, isolating such hot spots to the instruction level permits compiler writers to find significant areas of suboptimal code generation, at which they may focus their efforts to improve code generation efficiency. Another potential use of instruction level detail is to provide guidance to the designer of future systems. Such designers employ profiling tools to find characteristic code sequences and/or single instructions that require optimization for the available software for a given type of hardware.

There are often costs associated with measuring a system in that the measurement itself perturbs the system. This effect is well understood in the study of elementary particle physics and is known as the Heisenberg uncertainty principle. With software tracing, the cost associated with the tracing can severely affect the system being profiled. The effect can range from disruption of the cache and the instruction pipeline to more mundane effects such as the overhead associated with the tracing.

One effect that may be measured is the overhead associated with the execution of instrumentation code within the execution flows of the application program. As the application program executes, the instrumentation may incur significant overhead in the form of calls to obtain system information, such as a call to obtain a current timestamp.

Another undesired effect in profiling a program is that unwanted effects may be caused by the system to the information that the profiling processes are attempting to capture. Since most computer systems are interruptable, multi-tasking systems, the operating system may perform certain actions underneath the profiling processes, unbeknownst to the profiling processes. The most prevalent of these actions is a thread-switch. While a profiling process is attempting to capture information about the occurrence of an event within a particular thread, the system may perform a thread switch. Once the profiling process obtains the desired information for recording within a trace file, the information may have changed due to the thread switch.

An important datum to be recorded about the occurrence of an event is its time of occurrence. However, during the attempt to retrieve the time of an event, a thread switch may occur, and the recorded time may not accurately reflect the actual time that the event occurred.

Therefore, it would be advantageous to provide a method and system for isolating the profiling processes from the effects caused by thread-switching, and it would be particularly advantageous to provide a thread-relative time value to the profiling processes.

SUMMARY OF THE INVENTION

A method and system for maintaining a thread-relative metric for trace data using device driver support is provided. A profiling process may detect a current event, and in response to the current event, may request an elapsed metric since a preceding event. The profiling process then receives a thread-relative elapsed metric and may output a trace record for the current event in which is stored a metric equal to the received thread-relative elapsed metric. In response to a notification of an occurrence of the current event, a device driver computes the thread-relative elapsed metric by: determining a current thread; retrieving a stored metric for the preceding event of the current thread; obtaining a current metric; and computing the thread-relative elapsed metric as a difference between the current metric and the stored metric.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a diagram depicting the call stack containing stack frames;

FIG. 9 is an illustration depicting a call stack sample;

FIG. 10A is a diagram depicting a program execution sequence along with the state of the call stack at each function entry/exit point;

FIG. 10B is a diagram depicting a particular timer based sampling of the execution flow depicted in FIG. 10A;

FIGS. 10C–10D are time charts providing an example of the types of time for which the profiling tool accounts;

FIG. 15 is a diagram depicting a structured profile obtained using the processes of the present invention;

FIG. 16 is a diagram depicting a record generated using the processes of present invention;

FIG. 17 is a diagram depicting another type of report that may be produced to show the calling structure between routines shown in FIG. 12;

FIG. 18 is a table depicting a report generated from a trace file containing both event-based profiling information (method entry/exits) and sample-based profiling information (stack unwinds);

FIGS. 19A–19B are table depicting major codes and minor codes that may be employed to instrument modules for profiling;

DETAILED DESCRIPTION OF THE PREFERRED EMBODIMENT

Figure 1:
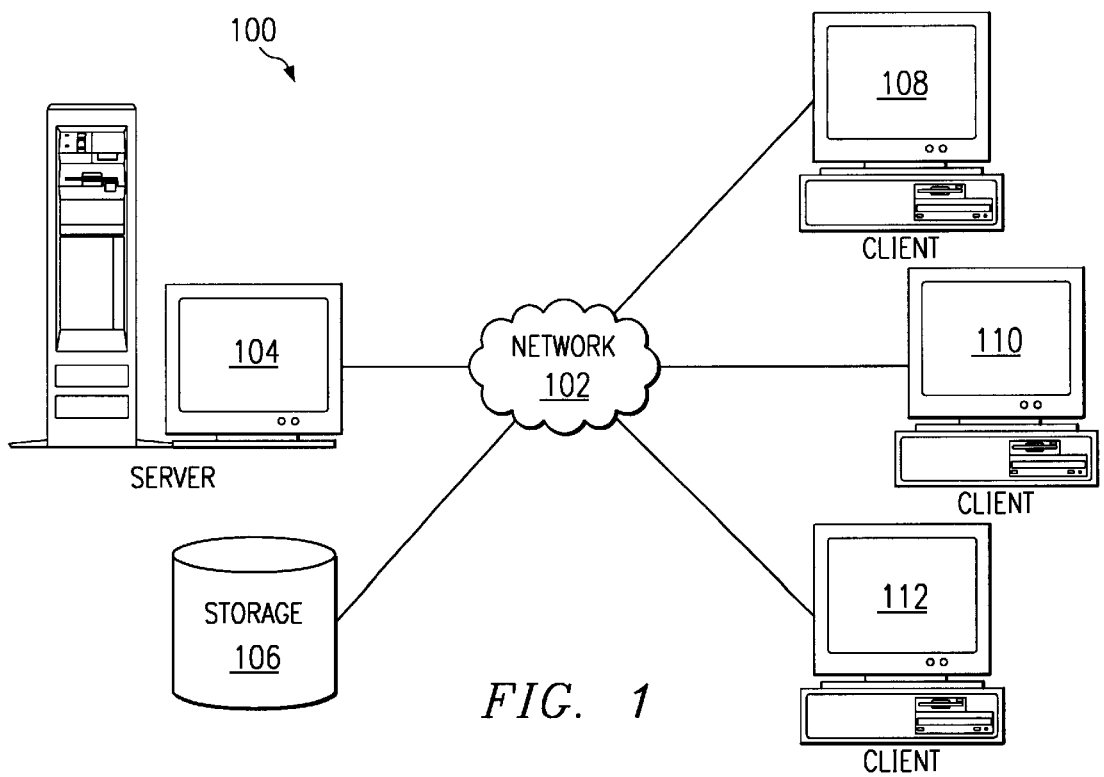
FIG. 1 is an illustration depicting a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention.

Figure 2A:
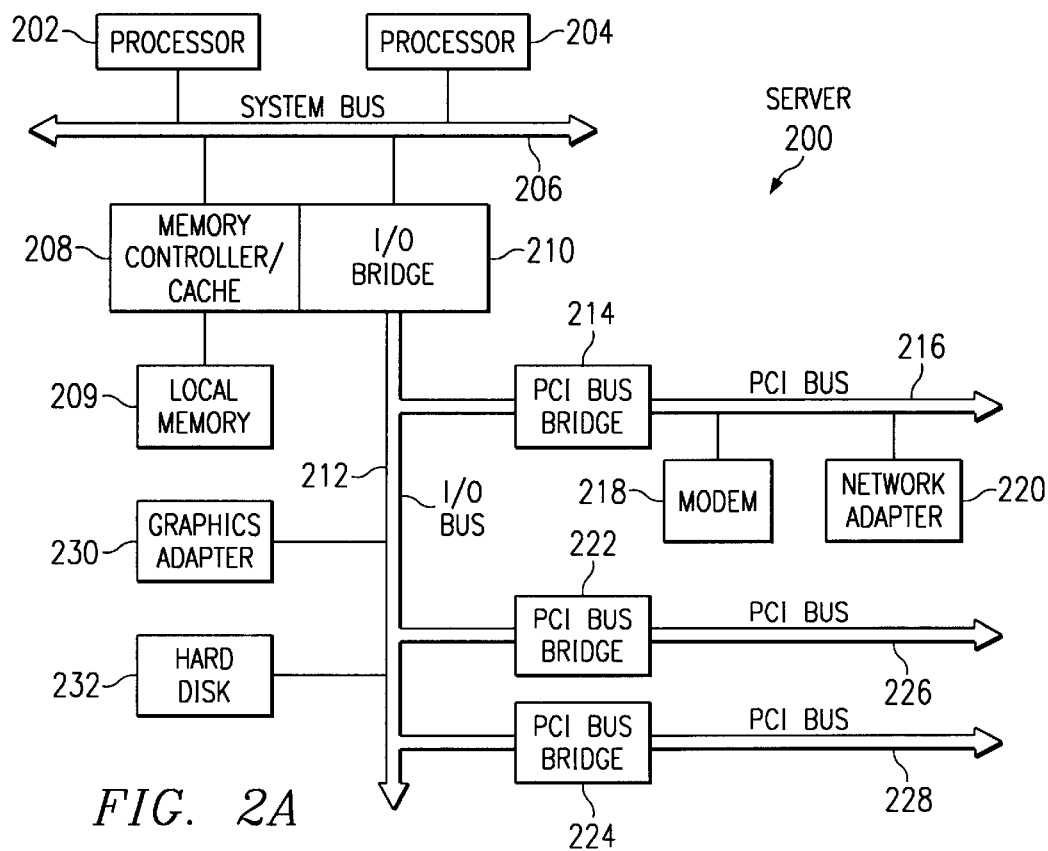
FIGS. 2A–2B are block diagrams depicting a data processing system in which the present invention may be implemented.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
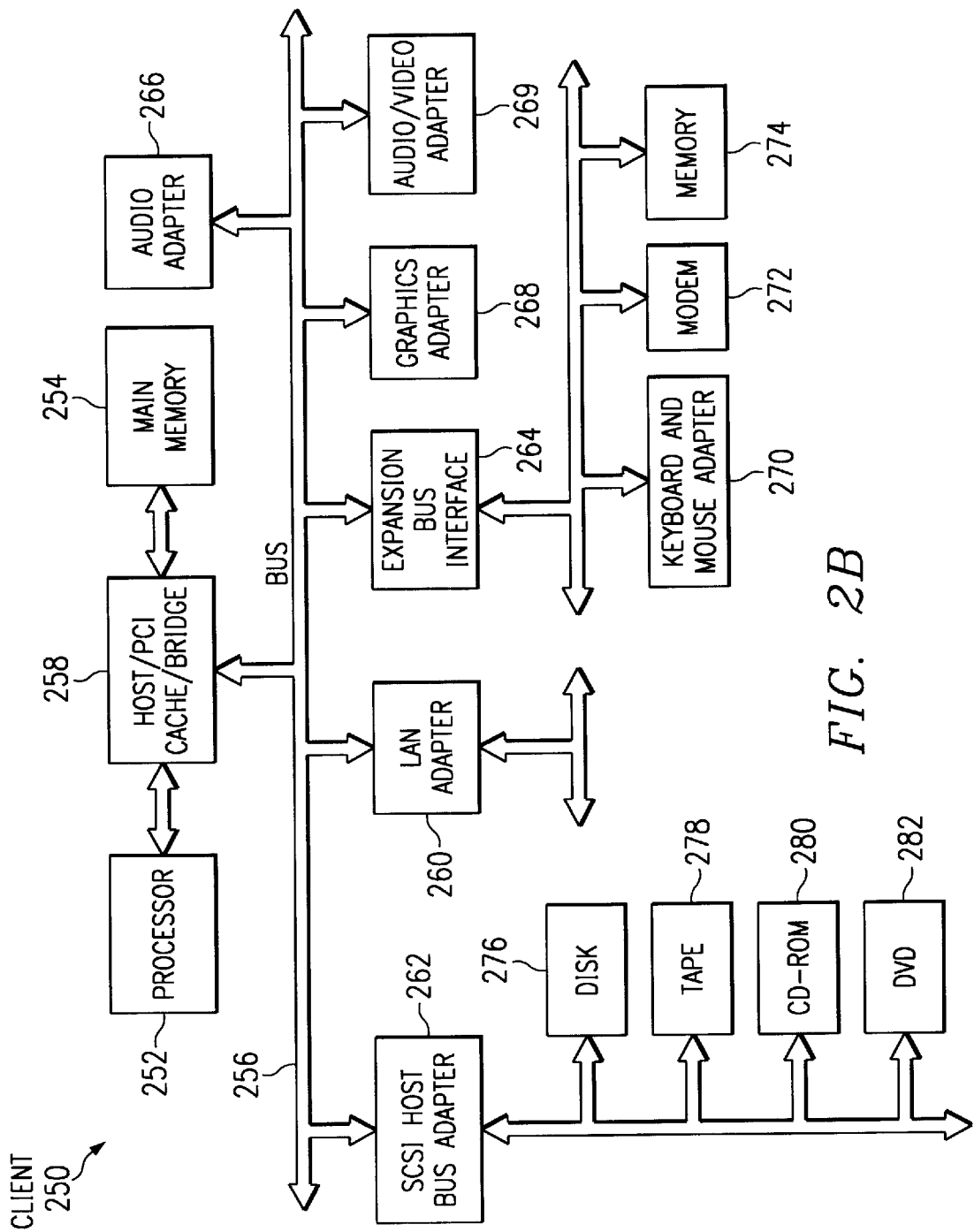

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as JavaOS For Business™ or OS/12™, which are available from International Business Machines Corporation™. JavaOS is loaded from a server on a network to a network client and supports Java programs and applets. A couple of characteristics of JavaOS that are favorable for performing traces with stack unwinds, as described below, are that JavaOS does not support paging or virtual memory. An object oriented programming system such as Java may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides a process and system for profiling software applications. Although the present invention may operate on a variety of computer platforms and operating systems, it may also operate within a Java runtime environment. Hence, the present invention may operate in conjunction with a Java virtual machine (JVM) yet within the boundaries of a JVM as defined by Java standard specifications. In order to provide a context for the present invention, portions of the operation of a JVM according to Java specifications are herein described.

Figure 3A:
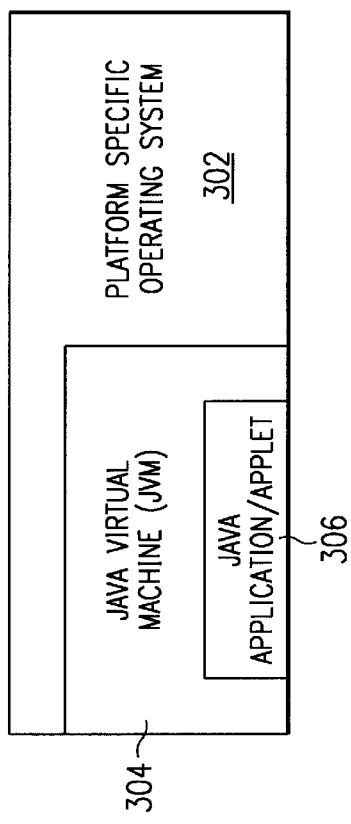
FIG. 3A is a block diagram depicting the relationship of software components operating within a computer system that may implement the present invention.

With reference now to FIG. 3A, a block diagram illustrates the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded pico-Java core.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Byte codes are may be translated into native code by a just-in-time compiler or JIT.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

Interpreting code provides an additional benefit. Rather than instrumenting the Java source code, the interpreter may be instrumented. Trace data may be generated via selected events and timers through the instrumented interpreter without modifying the source code. Profile instrumentation is discussed in more detail further below.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 3B:
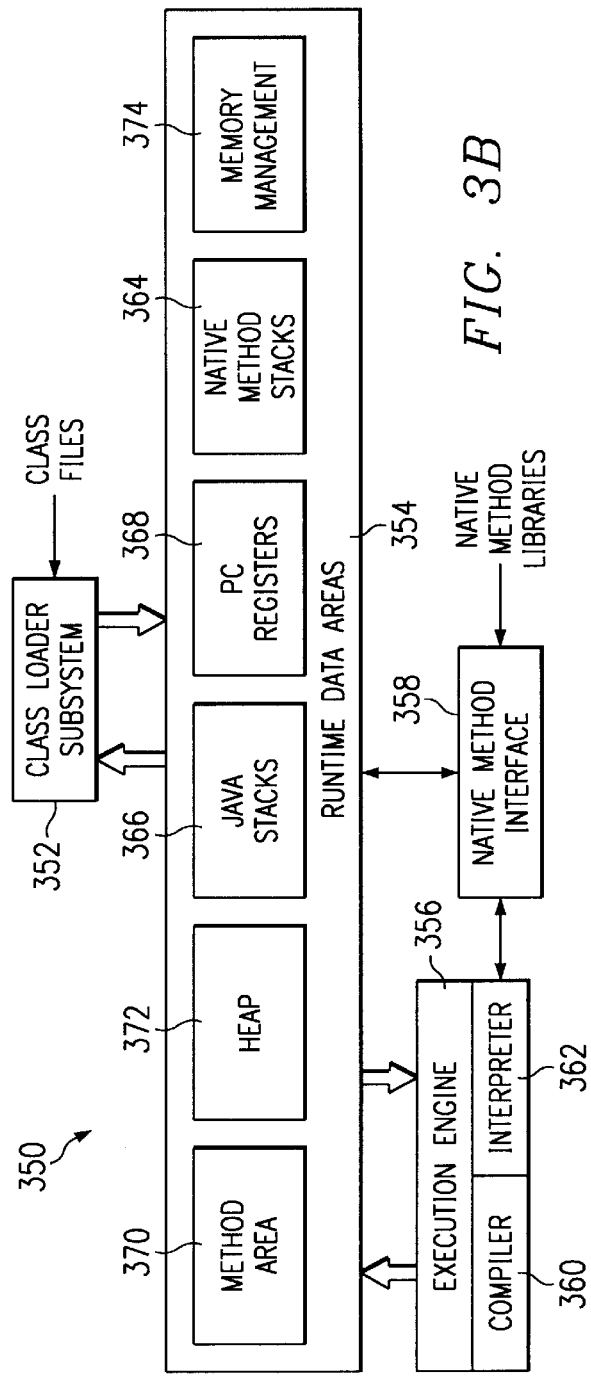
FIG. 3B is a block diagram depicting a Java virtual machine in accordance with a preferred embodiment of the present invention.

With reference now to FIG. 3B, a block diagram of a JVM is depicted in accordance with a preferred embodiment of the present invention. JVM 350 includes a class loader subsystem 352, which is a mechanism for loading types, such as classes and interfaces, given fully qualified names. JVM 350 also contains runtime data areas 354, execution engine 356, native method interface 358, and memory management 374. Execution engine 356 is a mechanism for executing instructions contained in the methods of classes loaded by class loader subsystem 352. Execution engine 356 may be, for example, Java interpreter 362 or just-in-time compiler 360. Native method interface 358 allows access to resources in the underlying operating system. Native method interface 358 may be, for example, a Java native interface.

Runtime data areas 354 contain native method stacks 364, Java stacks 366, PC registers 368, method area 370, and heap 372. These different data areas represent the organization of memory needed by JVM 350 to execute a program.

Java stacks 366 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

PC registers 368 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 364 store the state of invocations of native methods. The state of native method invocations is stored in an implementation-dependent way in native method stacks, registers, or other implementation-dependent memory areas. In some JVM implementations, native method stacks 364 and Java stacks 366 are combined.

Method area 370 contains class data while heap 372 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 372. JVM 350 includes an instruction that allocates memory space within the memory for heap 372 but includes no instruction for freeing that space within the memory. Memory management 374 in the depicted example manages memory space within the memory allocated to heap 370. Memory management 374 may include a garbage collector which automatically reclaims memory used by objects that are no longer referenced. Additionally, a garbage collector also may move objects to reduce heap fragmentation.

The processes within the following figures provide an overall perspective of the many processes employed within the present invention: processes that generate event-based profiling information in the form of specific types of records in a trace file; processes that generate sample-based profiling information in the form of specific types of records in a trace file; processes that read the trace records to generate more useful information to be placed into profile reports; and processes that generate the profile reports for the user of the profiling utility.

Figure 4:
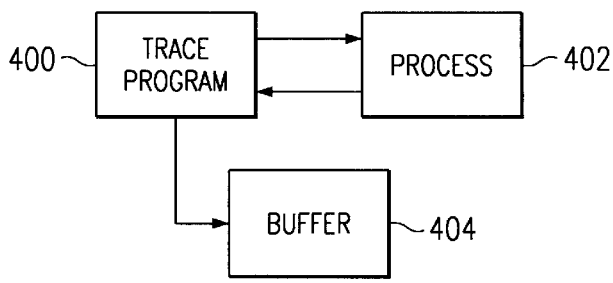
FIG. 4 is a block diagram depicting components used to profile processes in a data processing system.

With reference now to FIG. 4, a block diagram depicts components used to profile processes in a data processing system. A trace program 400 is used to profile processes 402. Trace program 400 may be used to record data upon the execution of a hook, which is a specialized piece of code at a specific location in a routine or program in which other routines may be connected. Trace hooks are typically inserted for the purpose of debugging, performance analysis, or enhancing functionality. These trace hooks are employed to send trace data to trace program 400, which stores the trace data in buffer 404. The trace data in buffer 404 may be stored in a file for post-processing. With Java operating systems, the present invention employs trace hooks that aid in identifying methods that may be used in processes 402. In addition, since classes may be loaded and unloaded, these changes may also be identified using trace data. This is especially relevant with "network client" data processing systems, such as those that may operate under JavaOS, since classes and jitted methods may be loaded and unloaded more frequently due to the constrained memory and role as a network client.

Figure 5:
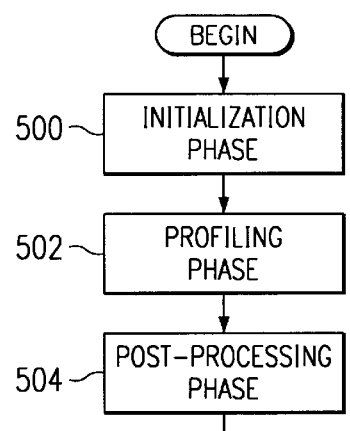
FIG. 5 is an illustration depicting various phases in profiling the active processes in an operating system.

With reference now to FIG. 5, a diagram depicts various phases in profiling the processes active in an operating system. Subject to memory constraints, the generated trace output may be as long and as detailed as the analyst requires for the purpose of profiling a particular program.

An initialization phase 500 is used to capture the state of the client machine at the time tracing is initiated. This trace initialization data includes trace records that identify all existing threads, all loaded classes, and all methods for the loaded classes. Records from trace data captured from hooks are written to indicate thread switches, interrupts, and loading and unloading of classes and jitted methods. Any class which is loaded has trace records that indicate the name of the class and its methods. In the depicted example, four byte IDs are used as identifiers for threads, classes, and methods. These IDs are associated with names output in the records. A record is written to indicate when all of the start up information has been written.

Next, during the profiling phase 502, trace records are written to a trace buffer or file. Trace records may originate from two types of profiling actions--event-based profiling and sample-based profiling. In the present invention, the trace file may have a combination of event-based records, such as those that may originate from a trace hook executed in response to a particular type of event, e.g., a method entry or method exit, and sample-based records, such as those that may originate from a stack walking function executed in response to a timer interrupt, e.g., a stack unwind record, also called a call stack record.

For example, the following process may occur during the profiling phase if the user of the profiling utility has requested sample-based profiling information. Each time a particular type of timer interrupt occurs, a trace record is written, which indicates the system program counter. This system program counter may be used to identify the routine that is interrupted. In the depicted example, a timer interrupt is used to initiate gathering of trace data. Of course, other types of interrupts may be used other than timer interrupts. Interrupts based on a programmed performance monitor event or other types of periodic events may be employed.

In the post-processing phase 504, the data collected in the buffer is sent to a file for post-processing. In one configuration, the file may be sent to a server, which determines the profile for the processes on the client machine. Of course, depending on available resources, the post-processing also may be performed on the client machine. In post-processing phase 504, B-trees and/or hash tables may be employed to maintain names associated the records in the trace file to be processed. A hash table employs hashing to convert an identifier or a key, meaningful to a user, into a value for the location of the corresponding data in the table. While processing trace records, the B-trees and/or hash tables are updated to reflect the current state of the client machine, including newly loaded jitted code or unloaded code. Also, in the post-processing phase 504, each trace record is processed in a serial manner. As soon as the indicator is encountered that all of the startup information has been processed, event-based trace records from trace hooks and sample-based trace records from timer interrupts are then processed. Timer interrupt information from the timer interrupt records are resolved with existing hash tables. In addition, this information identifies the thread and function being executed. The data is stored in hash tables with a count identifying the number of timer tick occurrences associated with each way of looking at the data. After all of the trace records are processed, the information is formatted for output in the form of a report.

Alternatively, trace information may be processed on-the-fly so that trace data structures are maintained during the profiling phase. In other words, while a profiling function, such as a timer interrupt, is executing, rather than (or in addition to) writing trace records to a buffer or file, the trace record information is processed to construct and maintain any appropriate data structures.

For example, during the processing of a timer interrupt during the profiling phase, a determination could be made as to whether the code being interrupted is being interpreted by the Java interpreter. If the code being interrupted is interpreted, the method ID of the method being interpreted may be placed in the trace record. In addition, the name of the method may be obtained and placed in the appropriate B-tree. Once the profiling phase has completed, the data structures may contain all the information necessary for generating a profile report without the need for post-processing of the trace file.

Figure 6:
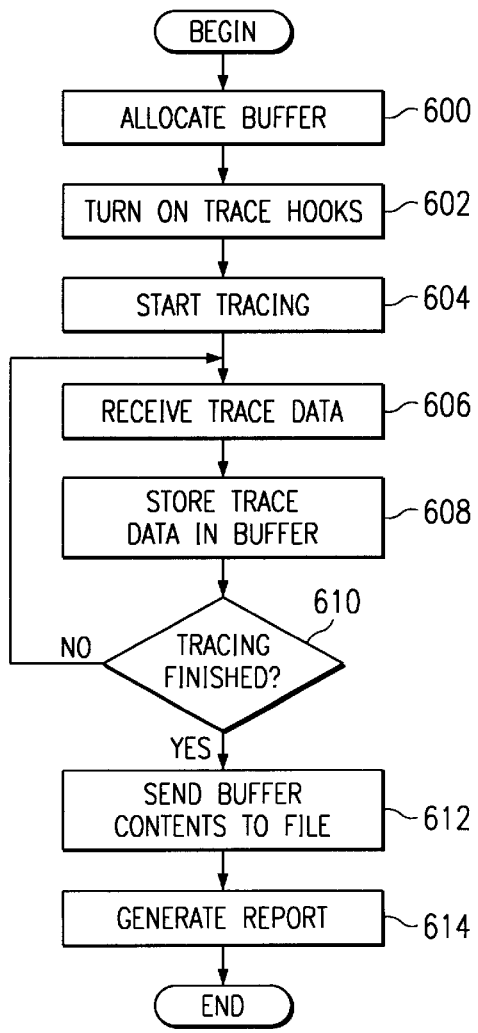
FIG. 6 is a flowchart depicting a process used by a trace program for generating trace records from processes executing on a data processing system.

With reference now to FIG. 6, a flowchart depicts a process used by a trace program for generating trace records from processes executing on a data processing system. FIG. 6 provides further detail concerning the generation of trace records that were not described with respect to FIG. 5.

Trace records may be produced by the execution of small pieces of code called "hooks". Hooks may be inserted in various ways into the code executed by processes, including statically (source code) and dynamically (through modification of a loaded executable). This process is employed after trace hooks have already been inserted into the process or processes of interest. The process begins by allocating a buffer (step 600), such as buffer 404 in FIG. 4. Next, in the depicted example, trace hooks are turned on (step 602), and tracing of the processes on the system begins (step 604). Trace data is received from the processes of interest (step 606). This type of tracing may be performed during phases 500 and/or 502. This trace data is stored as trace records in the buffer (step 608). A determination is made as to whether tracing has finished (step 610). Tracing finishes when the trace buffer has been filled or the user stops tracing via a command and requests that the buffer contents be sent to file. If tracing has not finished, the process returns to step 606 as described above.

Otherwise, when tracing is finished, the buffer contents are sent to a file for post-processing (step 612). A report is then generated in post-processing (step 614) with the process terminating thereafter.

Although the depicted example uses post-processing to analyze the trace records, the processes of the present invention may be used to process trace information in real-time depending on the implementation.

Figure 7:
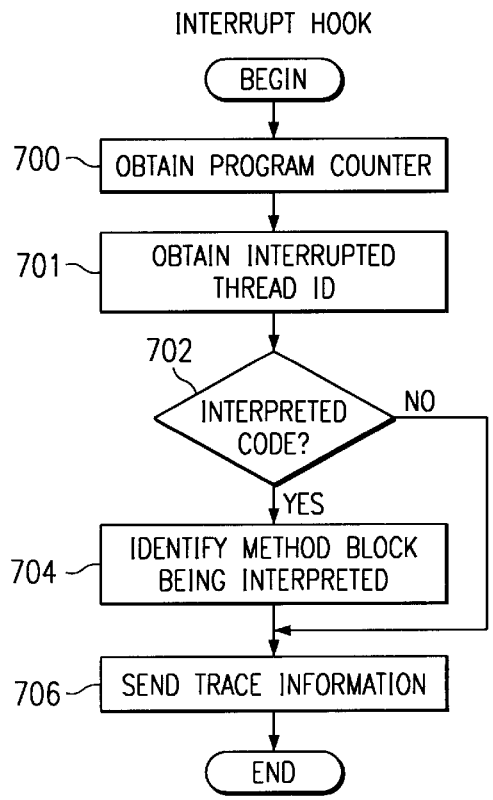
FIG. 7 is a flowchart depicting a process used in a system interrupt handler trace hook.

With reference now to FIG. 7, a flowchart depicts a process that may be used during an interrupt handler trace hook.

The process begins by obtaining a program counter (step 700). Typically, the program counter is available in one of the saved program stack areas. Thereafter, a determination is made as to whether the code being interrupted is interpreted code (step 702). This determination may be made by determining whether the program counter is within an address range for the interpreter used to interpret bytecodes. If the code being interrupted is interpreted, a method block address is obtained for the code being interpreted. A trace record is then written (step 706). The trace record is written by sending the trace information to a trace program, such as trace program 400, which generates trace records for post-processing in the depicted example. This trace record is referred to as an interrupt record, or an interrupt hook.

This type of trace may be performed during phase 502. Alternatively, a similar process, i.e. determining whether code that was interrupted is interpreted code, may occur during post-processing of a trace file.

In addition to event-based profiling, a set of processes may be employed to obtain sample-based profiling information. As applications execute, the applications may be periodically interrupted in order to obtain information about the current runtime environment. This information may be written to a buffer or file for post-processing, or the information may be processed on-the-fly into data structures representing an ongoing history of the runtime environment. FIGS. 8 and 9 describe sample-based profiling in more detail.

A sample-based profiler obtains information from the stack of an interrupted thread. The thread is interrupted by a timer interrupt presently available in many operating systems. The user of the trace facility selects either the program counter option or the stack unwind option, which may be accomplished by enabling one major code or another major code, as described further below. This timer interrupt is employed to sample information from a call stack. By walking back up the call stack, a complete call stack can be obtained for analysis. A "stack walk" may also be described as a "stack unwind", and the process of "walking the stack" may also be described as "unwinding the stack." Each of these terms illustrates a different metaphor for the process. The process can be described as "walking" as the process must obtain and process the stack frames step-by-step. The process may also be described as "unwinding" as the process must obtain and process the stack frames that point to one another, and these pointers and their information must be "unwound" through many pointer dereferences.

The stack unwind follows the sequence of functions/method calls at the time of the interrupt. A call stack is an ordered list of routines plus offsets within routines (i.e. modules, functions, methods, etc.) that have been entered during execution of a program. For example, if routine A calls routine B, and then routine B calls routine C, while the processor is executing instructions in routine C, the call stack is ABC. When control returns from routine C back to routine B, the call stack is AB. For more compact presentation and ease of interpretation within a generated report, the names of the routines are presented without any information about offsets. Offsets could be used for more detailed analysis of the execution of a program, however, offsets are not considered further herein.

Thus, during timer interrupt processing or at post-processing, the generated sample-based profile information reflects a sampling of call stacks, not just leaves of the possible call stacks, as in some program counter sampling techniques. A leaf is a node at the end of a branch, i.e. a node that has no descendants. A descendant is a child of a parent node, and a leaf is a node that has no children.

With reference now FIG. 8, a diagram depicts the call stack containing stack frames. A "stack" is a region of reserved memory in which a program or programs store status data, such as procedure and function call addresses, passed parameters, and sometimes local variables. A "stack frame" is a portion of a thread's stack that represents local storage (arguments, return addresses, return values, and local variables) for a single function invocation. Every active thread of execution has a portion of system memory allocated for its stack space. A thread's stack consists of sequences of stack frames. The set of frames on a thread's stack represent the state of execution of that thread at any time. Since stack frames are typically interlinked (e.g., each stack frame points to the previous stack frame), it is often possible to trace back up the sequence of stack frames and develop the "call stack". A call stack represents all not-yet-completed function calls—in other words, it reflects the function invocation sequence at any point in time.

Call stack 800 includes information identifying the routine that is currently running, the routine that invoked it, and so on all the way up to the main program. Call stack 800 includes a number of stack frames 802, 804, 806, and 808. In the depicted example, stack frame 802 is at the top of call stack 800, while stack frame 808 is located at the bottom of call stack 800. The top of the call stack is also referred to as the "root". The timer interrupt (found in most operating systems) is modified to obtain the program counter value (pcv) of the interrupted thread, together with the pointer to the currently active stack frame for that thread. In the Intel architecture, this is typically represented by the contents of registers: EIP (program counter) and EBP (pointer to stack frame). By accessing the currently active stack frame, it is possible to take advantage of the (typical) stack frame linkage convention in order to chain all of the frames together. Part of the standard linkage convention also dictates that the function return address be placed just above the invoked-function's stack frame; this can be used to ascertain the address for the invoked function. While this discussion employs an Intel-based architecture, this example is not a restriction. Most architectures employ linkage conventions that can be similarly navigated by a modified profiling interrupt handler.

When a timer interrupt occurs, the first parameter acquired is the program counter value. The next value is the pointer to the top of the current stack frame for the interrupted thread. In the depicted example, this value would point to EBP 808*a* in stack frame 808. In turn, EBP 808 points to EBP 806*a* in stack frame 806, which in turn points to EBP 804*a* in stack frame 804. In turn, this EBP points to EBP 802*a* in stack frame 802. Within stack frames 802–808 are EIPs 802*b*–808*b*, which identify the calling routine's return address. The routines may be identified from these addresses. Thus, routines are defined by collecting all of the return addresses by walking up or backwards through the stack.

With reference now to the FIG. 9, an illustration of a call stack is depicted. A call stack, such as call stack 900 is obtained by walking the call stack. A call stack is obtained each time a periodic event, such as, for example, a timer interrupt occurs. These call stacks may be stored as call stack unwind trace records within the trace file for post-processing or may be processed on-the-fly while the program continues to execute.

In the depicted example, call stack 900 contains a pid 902, which is the process identifier, and a tid 904, which is the thread identifier. Call stack 900 also contains addresses addr1 906, addr2 908 . . . addrN 910. In this example, addr1 906 represents the value of the program counter at the time of the interrupt. This address occurs somewhere within the scope of the interrupted function. addr2 908 represents an address within the process that called the function that was interrupted. For Intel-processor-based data processing systems, it represents the return address for that call; decrementing that value by 4 results in the address of the actual call, also known as the call-site. This corresponds with EIP 808*b* in FIG. 8; addrN 910 is the top of the call stack (EIP 802*b*). The call stack that would be returned if the timer interrupt interrupted the thread whose call stack state is depicted in FIG. 8 would consist of: a pid, which is the process id of the interrupted thread; a tid, which is the thread id for the interrupted thread; a pcv, which is a program counter value (not shown on FIG. 8) for the interrupted thread; EIP 808*b*; EIP 806*b*; EIP 804*b*; and EIP 802*b*. In terms of FIG. 9, pcv=addr1, EIP 808*b*=addr2, EIP 806*b*=addr3, EIP 804*b*=addr4, EIP 802*b*=addr5.

With reference now to FIG. 10A, a diagram of a program execution sequence along with the state of the call stack at each function entry/exit point is provided. The illustration shows entries and exits occurring at regular time intervals, but this is only a simplification for the illustration. If each function (A, B, C, and X in the figure) were instrumented with entry/exit event hooks, then complete accounting of the time spent within and below each function would be readily obtained. Note in FIG. 10A that at time 0, the executing thread is in routine C. The call stack at time 0 is C. At time 1, routine C calls routine A, and the call stack becomes CA and so on. It should be noted that the call stack in FIG. 10A is a reconstructed call stack that is generated by processing the event-based trace records in a trace file to follow such events as method entries and method exits.

The accounting technique and data structure are described in more detail further below. Unfortunately, this type of instrumentation can be expensive, can introduce bias, and in some cases, can be hard to apply. Sample-based profiling, by sampling the program's call stack, helps to alleviate the performance bias (and other complications) that entry/exit hooks produce.

Consider FIG. 10B, in which the same program is executed but is being sampled on a regular basis (in the example, the interrupt occurs at a frequency equivalent to two timestamp values). Each sample includes a snapshot of the interrupted thread's call stack. Not all call stack combinations are seen with this technique (note that routine X does not show up at all in the set of call stack samples in FIG. 10B). This is an acceptable limitation of sampling. The idea is that with an appropriate sampling rate (e.g., 30–1000 times per second), the call stacks in which most of the time is spent will be identified. Although some call stacks are omitted, it is a minor issue provided these call stacks are combinations for which little time is consumed.

In the event-based traces, there is a fundamental assumption that the traces contain information about routine entries and matching routine exits. Often, entry-exit pairs are nested in the traces because routines call other routines. Time spent (or memory consumed) between entry into a routine and exit from the same routine is attributed to that routine, but a user of a profiling tool may want to distinguish between time spent directly in a routine and time spent in other routines that it calls.

FIG. 10C shows an example of the manner in which time may be expended by two routines: a program's "main" calls routine A at time "t" equal to zero; routine A computes for 1 ms and then calls routine B; routine B computes for 8 ms and then returns to routine A; routine A computes for 1 ms and then returns to "main". From the point of view of "main", routine A took 10 ms to execute, but most of that time was spent executing instructions in routine B and was not spent executing instructions within routine A. This is a useful piece of information for a person attempting to optimize the example program. In addition, if routine B is called from many places in the program, it might be useful to know how much of the time spent in routine B was on behalf of (or when called by) routine A and how much of the time was on behalf of other routines.

A fundamental concept in the output provided by the methods described herein is the call stack. The call stack consists of the routine that is currently running, the routine that invoked it, and so on all the way up to main. A profiler may add a higher, thread level with the pid/tid (the process IDs and thread IDs). In any case, an attempt is made to follow the trace event records, such as method entries and exits, as shown in FIG. 10A, to reconstruct the structure of the call stack frames while the program was executing at various times during the trace.

The post-processing of a trace file may result in a report consisting of three kinds of time spent in a routine, such as routine A: (1) base time—the time spent executing code in routine A itself; (2) cumulative time (or "cum time" for short)—the time spent executing in routine A plus all the time spent executing every routine that routine A calls (and all the routines they call, etc.); and (3) wall-clock time or elapsed time. This type of timing information may be obtained from event-based trace records as these records have timestamp information for each record.

A routine's cum time is the sum of all the time spent executing the routine plus the time spent executing any other routine while that routine is below it on the call stack. In the example above in FIG. 10C, routine A's base time is 2 ms, and its cum time is 10 ms. Routine B's base time is 8 ms, and its cum time is also 8 ms because it does not call any other routines. It should be noted that cum time may not be generated if a call stack tree is being generated on-the-fly—cum time may only be computed after the fact during the post-processing phase of a profile utility.

For wall-clock or elapsed time, if while routine B was running, the system fielded an interrupt or suspended this thread to run another thread, or if routine B blocked waiting on a lock or I/O, then routine B and all the entries above routine B on the call stack accumulate elapsed time but not base or cum time. Base and cum time are unaffected by interrupts, dispatching, or blocking. Base time only increases while a routine is running, and cum time only increases while the routine or a routine below it on the call stack is running.

In the example in FIG. 10C, routine A's elapsed time is the same as its cum time—10 ms. Changing the example slightly, suppose there was a 1 ms interrupt in the middle of B, as shown in FIG. 10D. Routine A's base and cum time are unchanged at 2 ms and 10 ms, but its elapsed time is now 11 ms.

Although base time, cum time and elapsed time were defined in trems of processor time spent in routines, sample based profiling is useful for attributing consumption of almost any system resource to a set of routines, as described in more detail below with respect to FIG. 11B. Referring to FIG. 10C again, if routine A initiated two disk I/O's, and then routine B initiated three more I/O's when called by routine A, routine A's "base I/O's" are two and routine A's "cum I/O's" are five. "Elapsed I/O's" would be all I/O's, including those by other threads and processes, that occurred between entry to routine A and exit from routine A. More general definitions for the accounting concepts during pro-filing would be the following: base—the amount of the tracked system resource consumed directly by this routine; cum—the amount of the tracked system resource consumed by this routine and all routines below it on the call stack; elapsed—the total amount of the tracked system resource consumed (by any routine) between entry to this routine and exit from the routine.

As noted above, FIGS. 10A–10D describe the process by which a reconstructed call stack may be generated by processing the event-based trace records in a trace file by following such events as method entries and method exits. Hence, although FIGS. 11A–14 describe call stack trees that may be applicable to processing sample-based trace records, the description below for generating or reconstructing call stacks and call stack trees in FIGS. 11A–14 is mainly directed to the processing of event-based trace records.

Figure 11A:
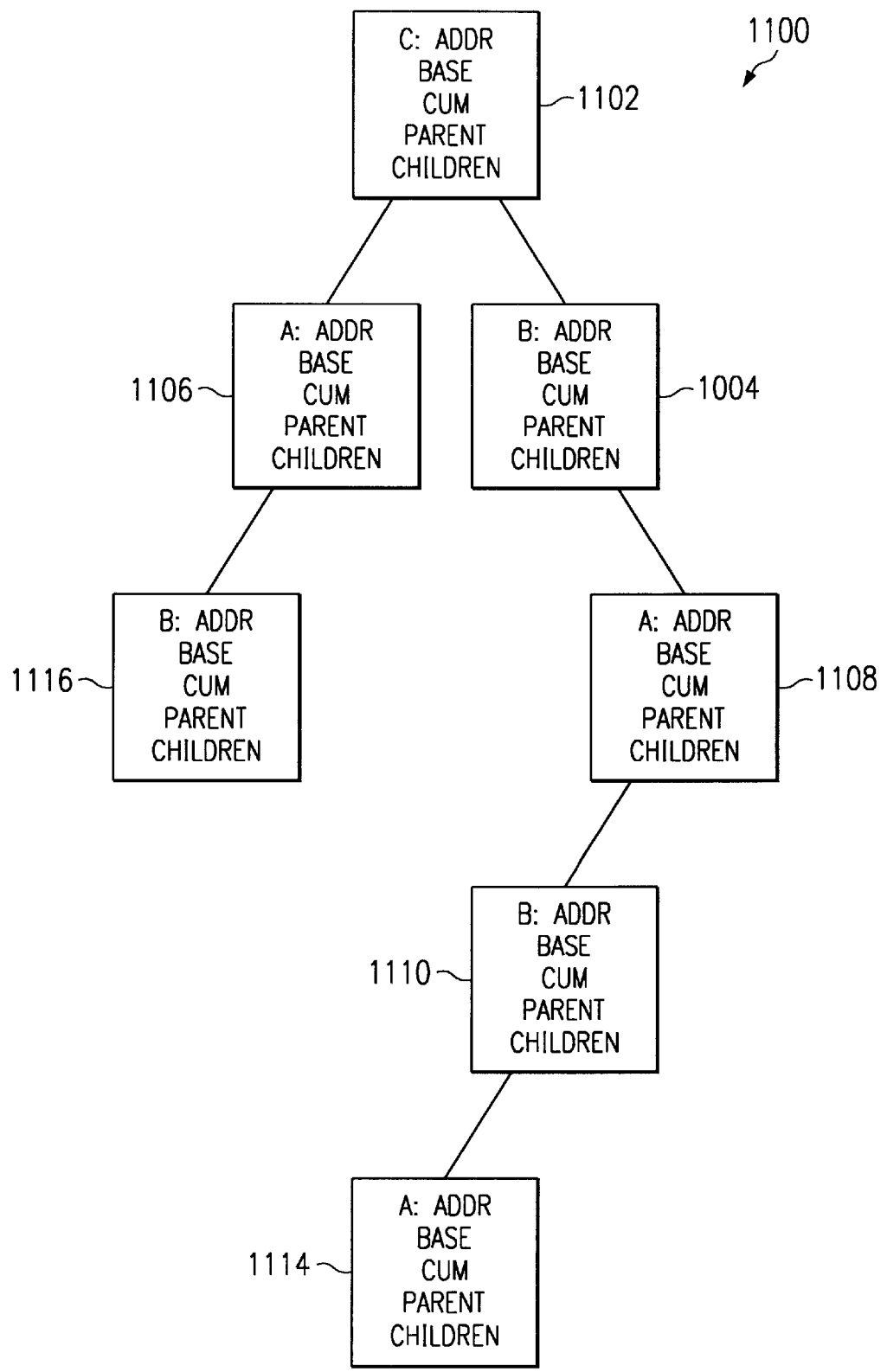
FIG. 11A is a diagram depicting a tree structure generated from sampling a call stack.

With reference now to FIG. 11A, a diagram depicts a tree structure generated from trace data. This figure illustrates a call stack tree 1100 in which each node in tree structure 1100 represents a function entry point.

Additionally, in each node in tree structure 1100, a number of statistics are recorded. In the depicted example, each node, nodes 1102–1108, contains an address (addr), a base time (BASE), cumulative time (CUM) and parent and children pointers. As noted above, this type of timing information may be obtained from event-based trace records as these records have timestamp information for each record. The address represents a function entry point. The base time represents the amount of time consumed directly by this thread executing this function. The cumulative time is the amount of time consumed by this thread executing this function and all functions below it on the call stack. In the depicted example, pointers are included for each node. One pointer is a parent pointer, a pointer to the node's parent. Each node also contains a pointer to each child of the node.

Those of ordinary skill in the art will appreciate that tree structure 1100 may be implemented in a variety of ways and that many different types of statistics may be maintained at the nodes other than those in the depicted example.

The call stack is developed from looking back at all return addresses. These return addresses will resolve within the bodies of those functions. This information allows for accounting discrimination between distinct invocations of the same function. In other words, if function X has 2 distinct calls to function A, the time associated with those calls can be accounted for separately. However, most reports would not make this distinction.

Figures 11B, 12:
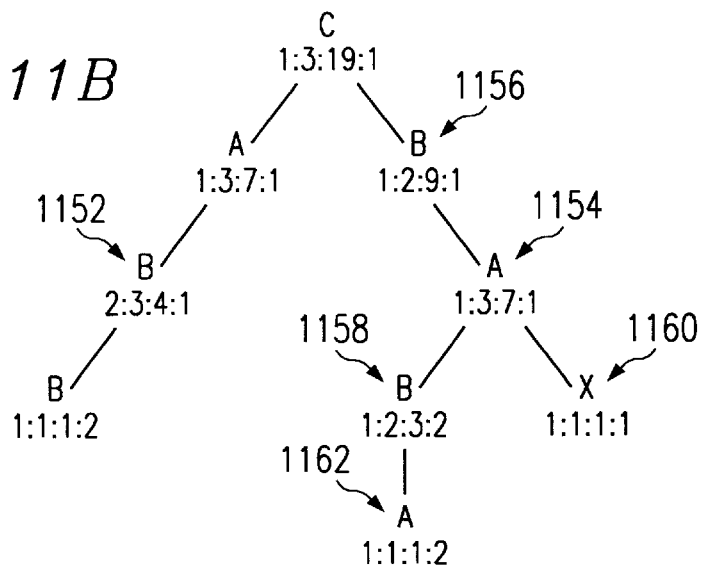
FIG. 11B is a diagram depicting an event tree which reflects call stacks observed during system execution.
FIG. 12 is a table depicting a call stack tree.

With reference now to FIG. 11B, a call stack tree which reflects call stacks observed during a specific example of system execution will now be described. At each node in the tree, several statistics are recorded. In the example shown in FIG. 11B, the statistics are time-based statistics. The particular statistics shown include the number of distinct times the call stack is produced, the sum of the time spent in the call stack, the total time spent in the call stack plus the time in those call stacks invoked from this call stack (referred to as cumulative time), and the number of instances of this routine above this instance (indicating depth of recursion).

For example, at node 1152 in FIG. 11B, the call stack is CAB, and the statistics kept for this node are 2:3:4:1. Note that call stack CAB is first produced at time 2 in FIG. 10A, and is exited at time 3. Call stack CAB is produced again at time 4, and is exited at time 7. Thus, the first statistic indicates that this particular call stack, CAB, is produced twice in the trace. The second statistic indicates that call stack CAB exists for three units of time (at time 2, time 4, and time 6). The third statistic indicates the cumulative amount of time spent in call stack CAB and those call stacks invoked from call stack CAB (i.e., those call stacks having CAB as a prefix, in this case CABB). The cumulative time in the example shown in FIG. 11B is four units of time. Finally, the recursion depth of call stack CAB is one, as none of the three routines present in the call stack have been recursively entered.

Those skilled in the art will appreciate that the tree structure depicted in FIG. 11B may be implemented in a variety of ways, and a variety of different types of statistics may be maintained at each node. In the described embodiment, each node in the tree contains data and pointers. The data include the name of the routine at that node, and the four statistics discussed above. Of course, many other types of statistical information may be stored at each node. In the described embodiment, the pointers for each node include a pointer to the node's parent, a pointer to the first child of the node (i.e. the left-most child), a pointer to the next sibling of the node, and a pointer to the next instance of a given routine in the tree. For example, in FIG. 11B, node 1154 would contain a parent pointer to node 1156, a first child pointer to node 1158, a next sibling pointer equal to NULL (note that node 1154 does not have a next sibling), and a next instance pointer to node 1162. Those skilled in the art will appreciate that other pointers may be stored to make subsequent analysis more efficient. In addition, other structural elements, such as tables for the properties of a routine that are invariant across instances (e.g., the routine's name), may also be stored.

The type of performance information and statistics maintained at each node are not constrained to time-based performance statistics. The present invention may be used to present many types of trace information in a compact manner which supports performance queries. For example, rather than keeping statistics regarding time, tracing may be used to track the number of Java bytecodes executed in each method (i.e., routine) called. The tree structure of the present invention would then contain statistics regarding bytecodes executed rather than time. In particular, the quantities recorded in the second and third categories would reflect the number of bytecodes executed rather than the amount of time spent in each method.

Tracing may also be used to track memory allocation and deallocation. Every time a routine creates an object, a trace record could be generated. The tree structure of the present invention would then be used to efficiently store and retrieve information regarding memory allocation. Each node would represent the number of method calls, the amount of memory allocated within a method, the amount of memory allocated by methods called by the method, and the number of methods above this instance (i.e., the measure of recursion). Those skilled in the art will appreciate that the tree structure of the present invention may be used to represent a variety of performance data in a manner which is very compact, and allows a wide variety of performance queries to be performed.

The tree structure shown in FIG. 11B depicts one way in which data may be pictorially presented to a user. The same data may also be presented to a user in tabular form as shown in FIG. 12.

With reference now to FIG. 12, a call stack tree presented as a table will now be described. Note that FIG. 12 contains a routine, pt_pidtid, which is the main process/thread which calls routine C. Table 12 includes columns of data for Level 1230, RL 1232, Calls 1234, Base 1236, Cum 1238, and Indent 1240. Level 1230 is the tree level (counting from the root as level 0) of the node. RL 1232 is the recursion level. Calls 1234 is the number of occurrences of this particular call stack, i.e., the number of times this distinct call stack configuration occurs. Base 1236 is the total observed time in the particular call stack, i.e., the total time that the stack had exactly these routines on the stack. Cum 1238 is the total time in the particular call stack plus deeper levels below it. Indent 1240 depicts the level of the tree in an indented manner. From this type of call stack configuration information, it is possible to infer each unique call stack configuration, how many times the call stack configuration occurred, and how long it persisted on the stack. This type of information also provides the dynamic structure of a program, as it is possible to see which routine called which other routine. However, there is no notion of time-order in the call stack tree. It cannot be inferred that routines at a certain level were called before or after other routines on the same level.

Figure 13:
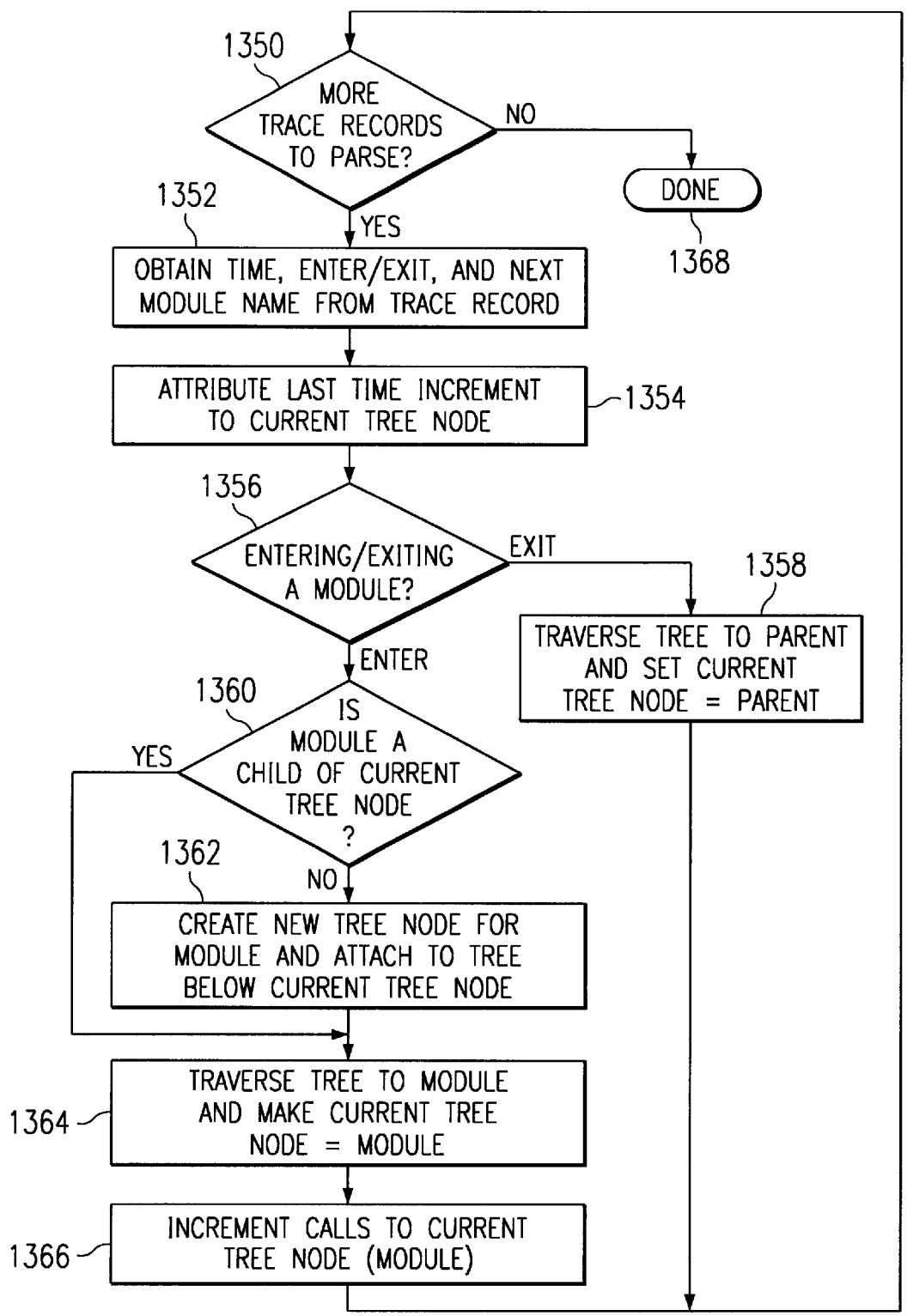
FIG. 13 is a flow chart depicting a method for building a call stack tree using a trace text file as input.

The pictorial view of the call stack tree, as illustrated in FIG. 11B, may be built dynamically or built statically using a trace text file or binary file as input. FIG. 13 depicts a flow chart of a method for building a call stack tree using a trace text file as input. In FIG. 13, the call stack tree is built to illustrate module entry and exit points.

With reference now to FIG. 13, it is first determined if there are more trace records in the trace text file (step 1350). If so, several pieces of data are obtained from the trace record, including the time, whether the event is an enter or an exit, and the module name (step 1352). Next, the last time increment is attributed to the current node in the tree (step 1354). A check is made to determine if the trace record is an enter or an exit record (step 1356). If it is an exit record, the tree is traversed to the parent (using the parent pointer), and the current tree node is set equal to the parent node (step 1358). If the trace record is an enter record, a check is made to determine if the module is already a child node of the current tree node (step 1360). If not, a new node is created for the module and it is attached to the tree below the current tree node (step 1362). The tree is then traversed to the module's node, and the current tree node is set equal to the module node (step 1364). The number of calls to the current tree node is then incremented (step 1366). This process is repeated for each trace record in the trace output file, until there are no more trace records to parse (step 1368).

Figure 14:
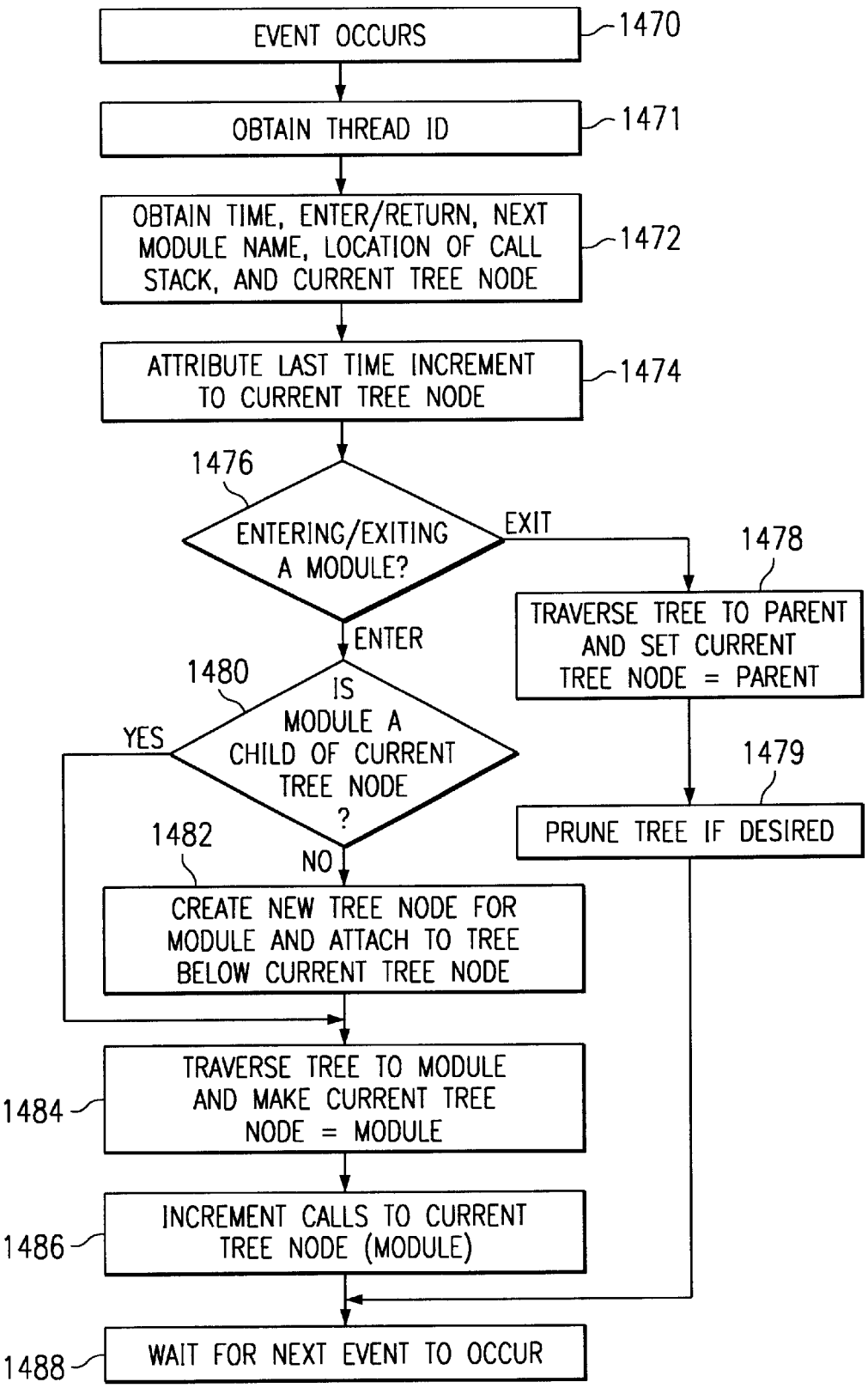
FIG. 14 is a flow chart depicting a method for building a call stack tree dynamically as tracing is taking place during system execution.

With reference now to FIG. 14, a flow chart depicts a method for building a call stack tree dynamically as tracing is taking place during system execution. In FIG. 14, as an event is logged, it is added to the tree in real time. Preferably, a call stack tree is maintained for each thread. The call stack tree reflects the call stacks recorded to date, and a current tree node field indicates the current location in a particular tree. When an event occurs (step 1470), the thread ID is obtained (step 1471). The time, type of event (i.e., in this case, whether the event is a method entry or exit), the name of the module (i.e., method), location of the thread's call stack, and location of the thread's "current tree node" are then obtained (step 1472). The last time increment is attributed to the current tree node (step 1474). A check is made to determine if the trace event is an enter or an exit event (step 1476). If it is an exit event, the tree is traversed to the parent (using the parent pointer), and the current tree node is set equal to the parent node (step 1478). At this point, the tree can be dynamically pruned in order to reduce the amount of memory dedicated to its maintenance (step 1479). Pruning is discussed in more detail below. If the trace event is an enter event, a check is made to determine if the module is already a child node of the current tree node (step 1480). If not, a new node is created for the module, and it is attached to the tree below the current tree node (step 1482). The tree is then traversed to the module's node, and the current tree node is set equal to the module node (step 1484). The number of calls to the current tree node is then incremented (step 1486). Control is then passed back to the executing module, and the dynamic tracing/reduction program waits for the next event to occur (step 1488).

One of the advantages of using the dynamic tracing/reduction technique described in FIG. 14 is its enablement of long-term system trace collection with a finite memory buffer. Very detailed performance profiles may be obtained without the expense of an "infinite" trace buffer. Coupled with dynamic pruning, the method depicted in FIG. 14 can support a fixed-buffer-size trace mechanism.

The use of dynamic tracing and reduction (and dynamic pruning in some cases) is especially useful in profiling the performance characteristics of long running programs. In the case of long running programs, a finite trace buffer can severely impact the amount of useful trace information that may be collected and analyzed. By using dynamic tracing and reduction (and perhaps dynamic pruning), an accurate and informative performance profile may be obtained for a long running program.

Many long-running applications reach a type of steady-state, where every possible routine and call stack is present in the tree and updating statistics. Thus, trace data can be recorded and stored for such applications indefinitely within the constraints of a bounded memory requirement using dynamic pruning. Pruning has value in reducing the memory requirement for those situations in which the call stacks are actually unbounded. For example, unbounded call stacks are produced by applications that load and run other applications.

Pruning can be performed in many ways, and a variety of pruning criteria is possible. For example, pruning decisions may be based on the amount of cumulative time attributed to a subtree. Note that pruning may be disabled unless the amount of memory dedicated to maintaining the call stack exceeds some limit. As an exit event is encountered (such as step 1478 in FIG. 14), the cumulative time associated with the current node is compared with the cumulative time associated with the parent node. If the ratio of these two cumulative times does not exceed a pruning threshold (e.g., 0.1), then the current node and all of its descendants are removed from the tree. The algorithm to build the tree proceeds as before by traversing to the parent, and changing the current node to the parent.

Many variations of the above pruning mechanism are possible. For example, the pruning threshold can be raised or lowered to regulate the level of pruning from very aggressive to none. More global techniques are also possible, including a periodic sweep of the entire call stack tree, removing all subtrees whose individual cumulative times are not a significant fraction of their parent node's cumulative times.

Data reduction allows analysis programs to easily and quickly answer many questions regarding how computing time was spent within the traced program. This information may be gathered by "walking the tree" and accumulating the data stored at various nodes within the call stack tree, from which it can be determined the amount of time spent strictly within routine A, the total amount of time spent in routine A and in the routines called by routine A either directly or indirectly, etc.

With reference now to the FIG. 15, a diagram of a structured profile obtained using the processes of the present invention is illustrated. Profile 1500 shows sample numbers in column 1502. Column 1504 shows the call stack with an identification of the functions present within the call stack at different sample times.

With reference now to FIG. 16, a diagram of a record generated using the processes of present invention is depicted. Each routine in record 1600 is listed separately, along with information regarding the routine in FIG. 16. For example, calls column 1604 lists the number of times each routine has been called. BASE column 1606 contains the total time spent in the routine, while CUM column 1608 includes the cumulative time spent in the routine and all routines called by the routine. Name column 1612 contains the name of the routine.

With reference now to FIG. 17, a diagram of another type of report that may be produced is depicted. The report depicted in FIG. 17 illustrates much of the same information found in FIG. 16, but in a slightly different format. As with FIG. 16, diagram 1700 includes information on calls, base time, and cumulative time.

FIG. 17 shows a sample-based trace output containing times spent within various routines as measured in microseconds. FIG. 17 contains one stanza (delimited by horizontal lines) for each routine that appears in the sample-based trace output. The stanza contains information about the routine itself on the line labeled "Self", about who called it on lines labeled "Parent", and about who the routine called on lines labeled "Child". The stanzas are in order of cum time. The third stanza is about routine A, as indicated by the line beginning with "Self." The numbers on the "Self" line of this stanza show that routine A was called three times in this trace, once by routine C and twice by routine B. In the profile terminology, routines C and B are (immediate) parents of routine A. Routine A is a child of routines C and B. All the numbers on the "Parent" rows of the second stanza are breakdowns of routine A's corresponding numbers. Three microseconds of the seven microsecond total base time spent in A was when it was called by routine C, and three microseconds when it was first called by routine B, and another one microsecond when it was called by routine B for a second time. Likewise, in this example, half of routine A's fourteen microsecond cum time was spent on behalf of each parent.

Looking now at the second stanza, we see that routine C called routine B and routine A once each. All the numbers on "Child" rows are subsets of numbers from the child's profile. For example, of the three calls to routine A in this trace, one was by routine C; of routine A's seven microsecond total base time, three microseconds were while it was called directly by routine C; of routine A's fourteen microsecond cum time, seven microseconds was on behalf of routine C. Notice that these same numbers are the first row of the third stanza, where routine C is listed as one of routine A's parents.

The four relationships that are true of each stanza are summarized at the top of FIG. 17. First, the sum of the numbers in the Calls column for parents equals the number of calls on the self row. Second, the sum of the numbers in the Base column for parents equals Self's base. Third, the sum of the numbers in the Cum column for parents equals Self's Cum. These first three invariants are true because these characteristics are the definition of Parent; collectively they are supposed to account for all of Self's activities. Fourth, the Cum in the Child rows accounts for all of Self's Cum except for its own Base.

Program sampling contains information from the call stack and provides a profile, reflecting the sampling of an entire call stack, not just the leaves. Furthermore, the sample-based profiling technique may also be applied to other types of stacks. For example, with Java programs, a large amount of time is spent in a routine called the "interpreter". If only the call stack was examined, the profile would not reveal much useful information. Since the interpreter also tracks information in its own stack, e.g., a Java stack (with its own linkage conventions), the process can be used to walk up the Java stack to obtain the calling sequence from the perspective of the interpreted Java program.

With reference now to FIG. 18, a figure depicts a report generated from a trace file containing both event-based profiling information (method entry/exits) and sample-based profiling information (stack unwinds). FIG. 18 is similar to FIG. 12, in which a call stack tree is presented as a report, except that FIG. 18 contains embedded stack walking information. Call stack tree 1800 contains two stack unwinds generated within the time period represented by the total of 342 ticks. Stack unwind identifier 1802 denotes the beginning of stack unwind information 1806, with the names of routines that are indented to the right containing the stack information that the stack walking process was able to discern. Stack unwind identifier 1804 denotes the beginning of stack unwind information 1808. In this example, "J:" identifies an interpreted Java method and "F:" identifies a native function, such as a native function within JavaOS. A call from a Java method to a native method is via "ExecuteJava." Hence, at the point at which the stack walking process reaches a stack frame for an "ExecuteJava," it cannot proceed any further up the stack as the stack frames are discontinued. The process for creating a tree containing both event-based 10 nodes and sample-based nodes is described in more detail further below. In this case, identifiers 1802 and 1804 also denote the major code associated with the stack unwind.

With reference now to FIGS. 19A–19B, tables depict major codes and minor codes that may be employed to instrument software modules for profiling. In order to facilitate the merging of event-based profiling information and sample-based profiling information, a set of codes may be used to turn on and off various types of profiling functions.

For example, as shown in FIGS. 19A–19B, the minor code for a stack unwind is designated as 0×7fffffff, which may be used for two different purposes. The first purpose, denoted with a major code of 0×40, is for a stack unwind during a timer interrupt. When this information is output into a trace file, the stack information that appears within the file will have been coded so that the stack information is analyzed as sample-based profiling information. The second purpose, denoted with a major code of 0×41, is for a stack unwind in an instrumented routine. This stack information could then be post-processed as event-based profiling information.

Other examples in the table show a profile or major code purpose of tracing jitted methods with a major code value of 0×50. Tracing of jitted methods may be distinguished based on the minor code that indicates method invocation or method exit. In contrast, a major code of 0×30 indicates a profiling purpose of instrumenting interpreted methods, while the minor code again indicates, with the same values, method invocation or method exit.

Referring back to FIG. 18, the connection can be made between the use of major and minor codes, the instrumentation of code, and the post-processing of profile information. In the generated report shown in FIG. 18, the stack unwind identifiers can be seen to be equal to 0×40, which, according to the tables in FIGS. 19A–19B, is a stack unwind generated in response to a timer interrupt. This type of stack unwind may have occurred in response to a regular interrupt that was created in order to generate a sampled profile of the executing software.

As noted in the last column of the tables in FIGS. 19A–19B, by using a utility that places a hook into a software module to be profiled, a stack unwind may be instrumented into a routine. If so, the output for this type of stack unwind will be designated with a major code of 0×41.

As stated previously, the attempt to determine execution flows within an application program causes side-effects and distortions in the profiling information to be recorded. The types of side-effects depend upon the manner in which the profiling is accomplished. One effect that may be measured is the overhead associated with the execution of instrumentation code within the execution flows of the application program. As the application program executes, the instrumentation may incur significant overhead in the form of calls to obtain system information, such as a call to obtain a current timestamp, and compensation may be made for some types of overhead in certain situations.

In addition to unwanted effects that may occur to the system by the profiling processes, another hazard in profiling a program lies in the reverse—unwanted effects may be caused by the system to the information that the profiling processes are attempting to capture. Since most computer systems are interruptable, multi-tasking systems, the operating system may perform certain actions underneath the profiling processes, unbeknownst to the profiling processes. The most prevalent of these actions is a thread-switch. While a profiling process is attempting to capture information about the occurrence of an event within a particular thread, the system may perform a thread switch. Once the profiling process obtains the desired information for recording, the information may have changed due to the thread switch.

An important datum concerning the occurrence of an event is its time of occurrence. However, during the retrieval of the time of an event, a thread switch may occur, and the recorded time may not accurately reflect the actual time that the event occurred. The present invention is directed to an approach for identifying and compensating for potential thread switches during the capture of a timestamp. The described processes may be useful not only for event timing but also for generalized, high resolution, thread-local timestamps for many types of application-level instrumentation in addition to event tracing.

In addition, the present invention may be generalized so that any increasing metric, such as a number of page faults or a number of events gathered from performance counters, may be employed in place of time. Rather than computing and storing a thread-relative elapsed time, the processes described below may compute and store a thread-relative elapsed metric.

Figure 20A:
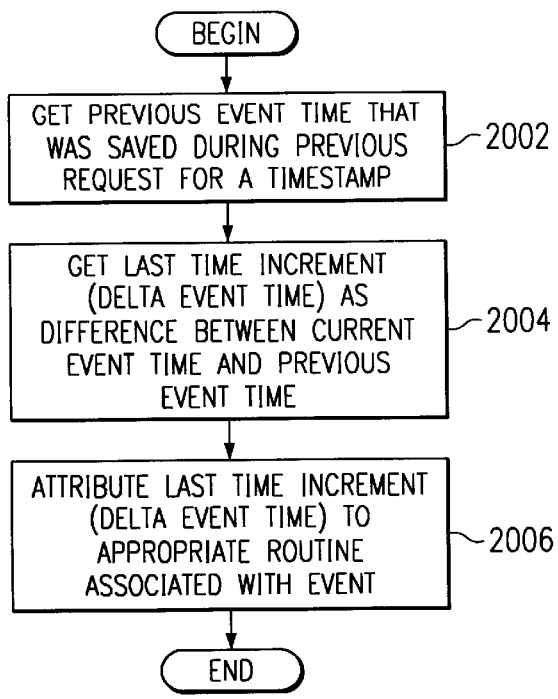
FIG. 20A is a flowchart depicting a summary of the manner in which elapsed time is attributed to various routines in an execution flow.

With reference now to FIG. 20A, a flowchart depicts a summary of the manner in which elapsed time is attributed to various routines in an execution flow. As noted previously, profiling events are generally processed and stored into a trace buffer in real-time, and at some subsequent time, the trace buffer is written to a trace file. The trace buffer may contain trace records, but at a minimum, the trace buffer should contain, for each event that has been recorded, an indication of the event location within the program that is being profiled. In addition, as noted above, the time at which an event occurred is also an important datum, and time information relating the time of the occurrence of the event should be stored in association with the event information. FIG. 20A is merely a summary of previously described processes concerning how timestamps relate to events and how time flow is attributed among routines within execution flows.

The process begins with the retrieval of the previous event time that was saved during the previous request for a timestamp, which may have occurred during the trace of the previous event (step 2002). The last time increment, or delta event time, is computed as the difference between the current event time and the previous event time (step 2004). The delta event time is then attributed to one of the routines associated with the occurrence of the event, e.g., the routine which is being entered during the event or the routine which is being exited during the event (step 2006). The process is then complete with respect to obtaining a time increment from a current trace event and determining the routine to which the time increment should be attributed.

Figure 20B:
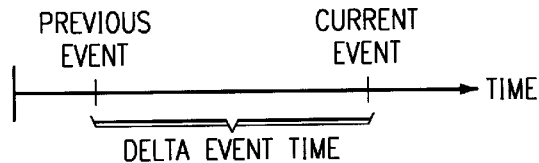
FIG. 20B is a timeline depicting demarcated time points with which the process in FIG. 20A is concerned.

With reference now to FIG. 20B, a timeline depicts demarcated time points with which the process in FIG. 20A is concerned. The previous event time is the timepoint at which a previous event has occurred, such as an entry event or an exit event. Alternatively, this timepoint is the time at which a timestamp was previously requested. The current event time is the timepoint at which the subsequent event has been recorded to occur, such as the next entry event or exit event.

Alternatively, this timepoint is the time at which a timestamp is currently being requested. The difference between the previous event time and the current event time is shown as the delta event time, also described as the last time increment.

The process described in FIG. 20A may encounter several problems in a multithreaded environment. If there are multiple undetected thread switches between the previous event and the current event, then the delta event time will be incorrectly determined and possibly incorrectly applied to a method in an unassociated thread. Because the instrumentation code may not be able to detect the occurrence of a thread switch, it may also not be able to determine when an actual thread switch happened. Therefore, in order to account for event times in an accurate manner, the present invention provides a mechanism for maintaining thread-relative time for trace data using support from a device driver or kernel routine.

Figure 21:
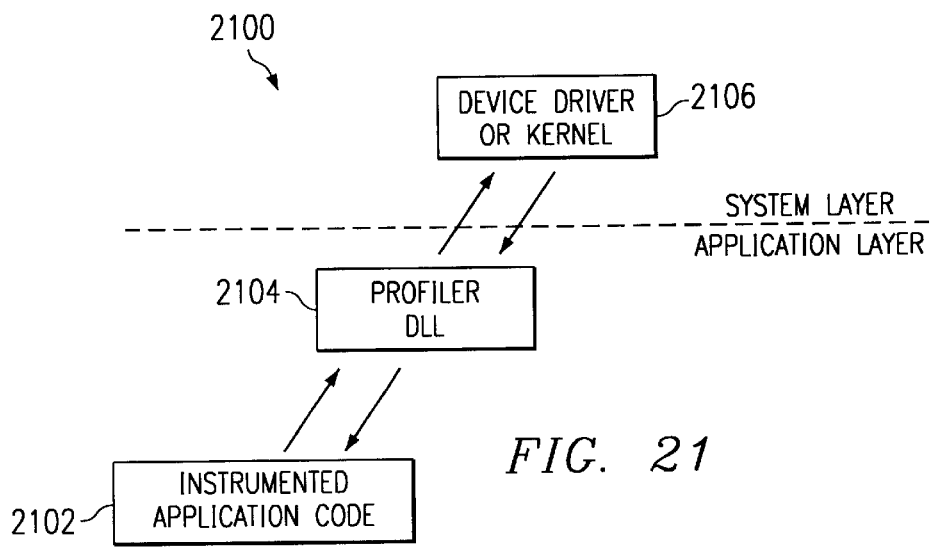
FIG. 21 is a block diagram depicting an organization of system components for obtaining accurate time handling in a multithreaded environment.

With reference now to FIG. 21, a block diagram depicts an organization of system components for obtaining accurate time handling in a multithreaded environment. System 2100 contains instrumented application code 2102 that, upon the occurrence of selected events, invoke methods or routines within profiling code, such as profiler dynamic link library (DLL) 2104. Profiler 2104 may contain the functionality necessary for generating trace records that are output to a trace buffer. Profiler 2104 may request and receive certain types of system information from device driver or kernel 2106. The device driver may keep thread-relative information, such as thread-relative metrics, in a variety of data structures, such as trees, linked lists, hash tables, etc. As a thread is dispatched, a node may be created for a newly dispatched thread, and when the thread terminates, the node may be either deleted or kept in memory for diagnostic or profiling purposes. This information may include a thread-relative elapsed time to be subsequently used as an amount of base time to be attributed to a routine or module executing within instrumented application code 2102.

Figure 22:
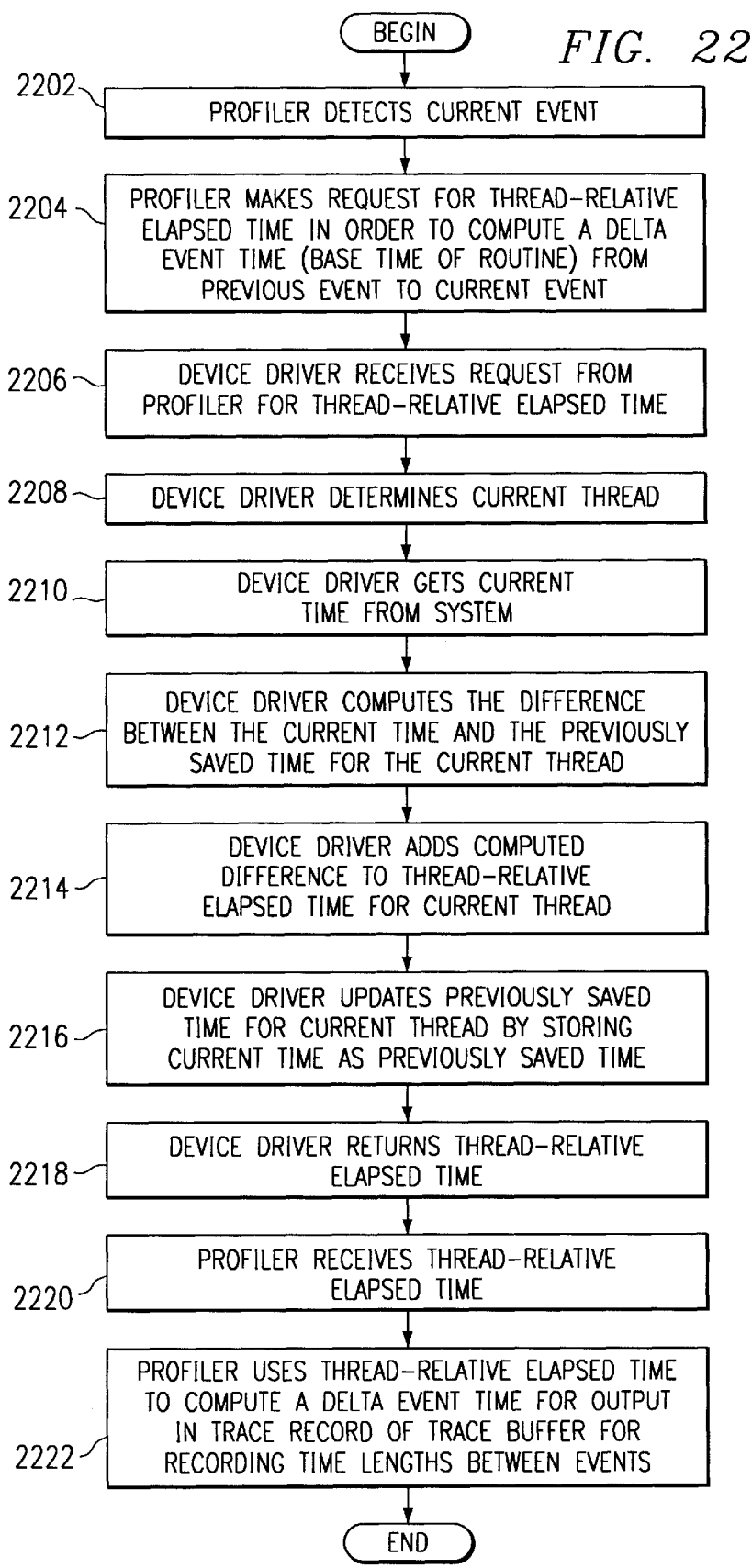
FIG. 22 is a flowchart depicting a process for obtaining a delta event time value for determining a thread-relative elapsed time between events.

With reference now to FIG. 22, a flowchart depicts a process for obtaining a delta event time value for determining a thread-relative elapsed time between events. The process begins when the profiler detects a current event (step 2202). The profiler then makes a request for the thread-relative elapsed time in order to compute a delta event time for the currently executing routine, i.e. the time from the previous event to the current event within the current thread (step 2204).

A device driver or kernel routine receives the request from the profiler for the thread-relative elapsed time (step 2206). The device driver determines the currently executing thread (step 2208) and gets the current time from the system (step 2210). The device driver then computes the difference between the current time and the previously saved time for the current thread (step 2212). The device driver then adds the computed difference to the thread-relative elapsed time for the current thread (step 2214) and updates the previously saved time for the current thread by storing the current time as the previously saved time, thereby maintaining a timestamp of the timepoint at which the thread-relative elapsed time was last updated (step 2216).

The device driver then returns the thread-relative elapsed time (step 2218), and the profiler receives the thread-relative elapsed time (step 2220). The profiler then uses the thread-relative elapsed time for various profiling purposes, such as outputting a value in an event trace record in the trace buffer for recording periods of time between events (step 2222). A post-processor may then use the recorded times in the trace file to attribute various execution times to modules or routines. The process is then complete with respect to obtaining a thread-relative elapsed time from the device driver.

Figure 23:
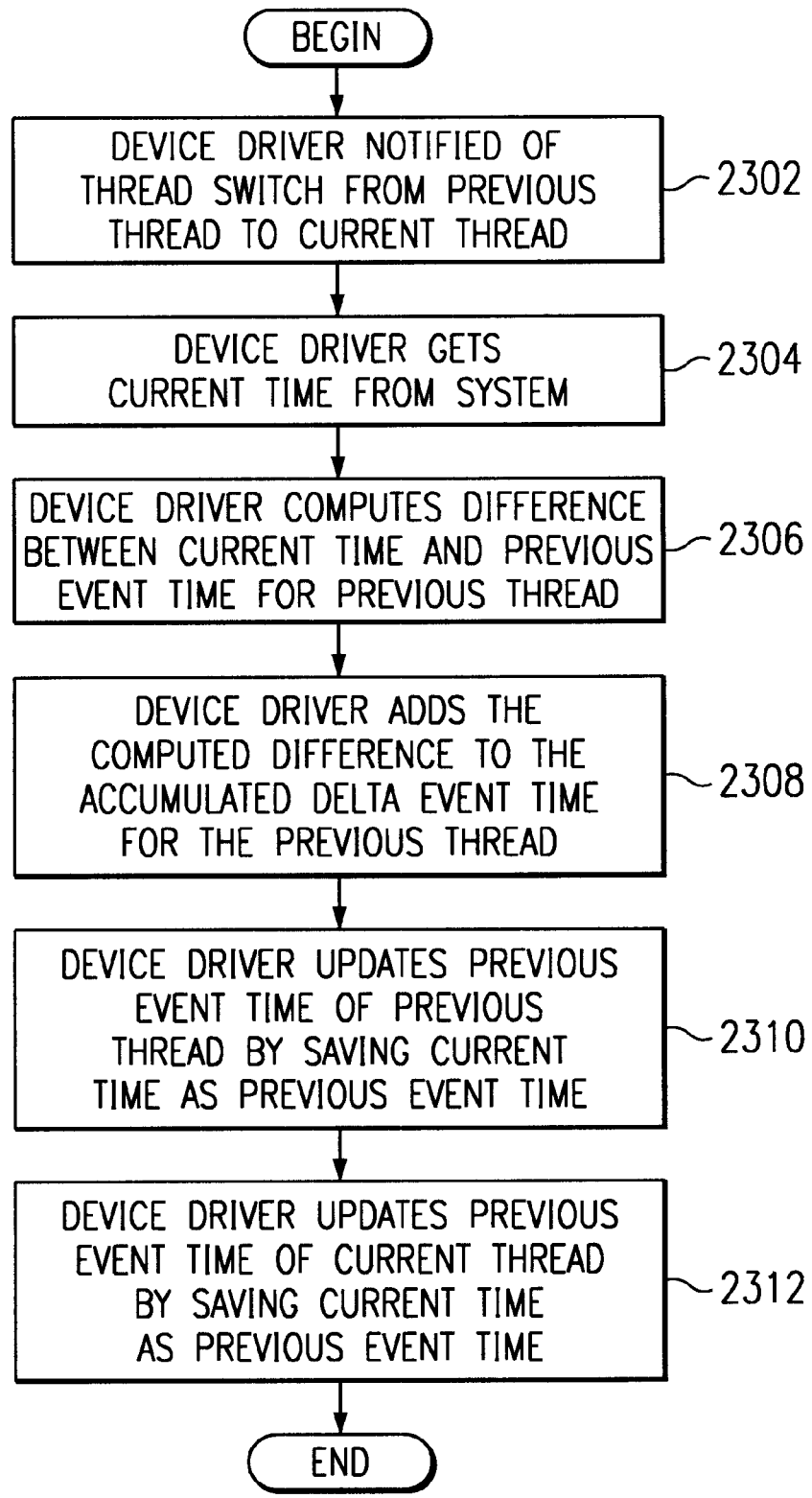
FIG. 23 is a flowchart depicting a process by which the device driver maintains information concerning thread switches that may occur between various instrumented events.

With reference now to FIG. 23, a flowchart depicts a process by which the device driver maintains information concerning thread switches that may occur between various instrumented events. The process begins when the device driver is notified of a thread switch from a previous thread to a current thread (step 2302). The device driver then gets the current time from the system (step 2304). The device driver computes the difference between the current time and the previous event time for the previous thread (step 2306). The computed difference is then added to the thread-relative elapsed time for the previous thread (step 2308).

The current time is then saved in the thread control block of the current thread as the previously saved time for the previous thread (step 2310). This provides a timestamp of the timepoint at which the thread-relative elapsed time was last updated. The current time is then saved in the thread control block of the current thread as the previously saved time for the previous thread (step 2314). This provides a timestamp of the timepoint at which the thread was reactivated or dispatched for subsequent time comparisons and computations. The process is then complete with respect to thread switch processing within the device driver.

Figure 24:
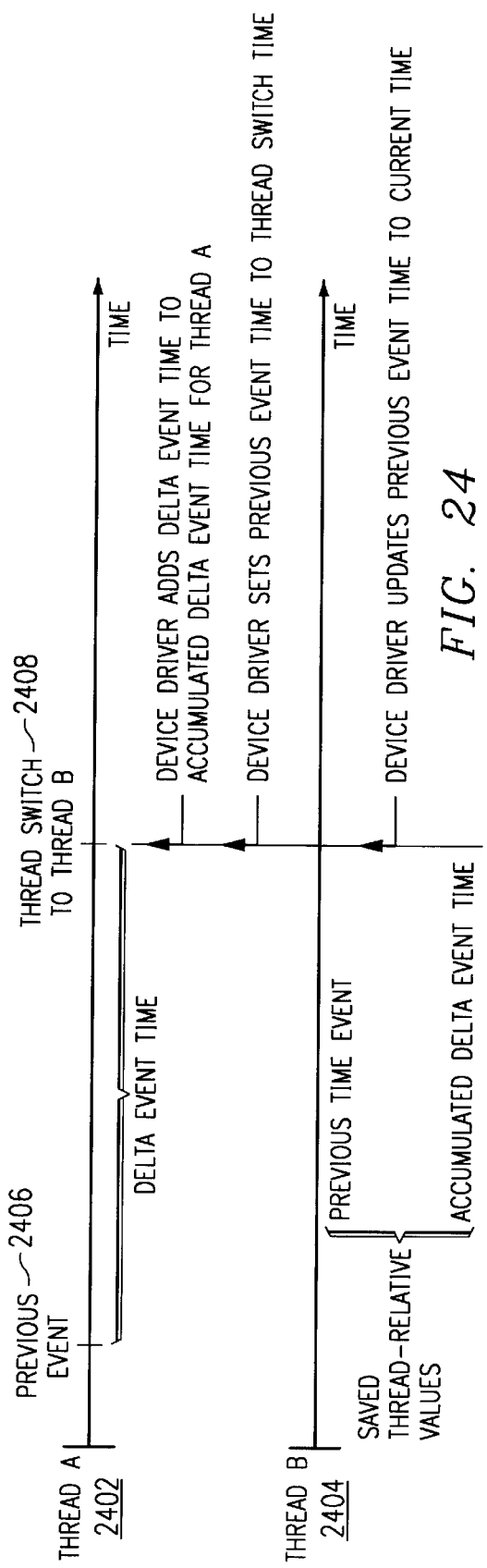
FIG. 24 is a set of timelines depicting some of the actions performed by the device driver with respect to a thread switch between two different threads.

With reference now to FIG. 24, a set of timelines depict some of the actions performed by the device driver with respect to a thread switch between two different threads. Timeline 2402 depicts the processing with respect to thread A, and timeline 2404 depicts some of the processing with respect to thread B. Previous event 2406 demarcates the timepoint at which a previous event was recorded to have occurred. At that time, an amount of delta event time began to accumulate between events within thread A. Also at that time, thread B is a dormant thread with two saved values: a previous event time for thread B; and a thread-relative elapsed time for thread B.

At timepoint 2408, a thread switch occurs between thread A and thread B. When notified of the thread switch, the device driver computes the thread-relative elapsed time for thread A and saves it for subsequent processing. The device driver also sets the previous event time for thread A to the current time, i.e. the time at which the thread switch occurs. With respect to thread B, the device driver must update the previous event time. At the end of a trace run, all elapsed times from the kernel may be applied to all threads processed by the profiler (or the post-processor), and the time spent in threads not known to the profile may be identified for total system analysis.

The advantages of the present invention are apparent in view of the detailed description of the invention provided above. A device driver or kernel maintains thread-relative time and supports an interface to obtain various times with respect to a given thread. The present invention identifies that a thread switch should stop the accumulation of base time for a routine or thread that is being deactivated or swapped out, and the proper time values are saved so that subsequent requests for thread-relative elapsed time may be determined. The present invention also identifies that a thread switch may occur during the instrumentation processing for the occurrence of an event, and the proper adjustments are made to ensure that improper time accounting does not occur in response to the thread switch at that time.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing for events detected while profiling all instrumented program executed by a virtual machine in a data processing system, the method comprising the computer-implemented stops of:
   in response to an occurrence of current event, receiving a request for a number of bytecodes executed by a thread running in the virtual machine since a preceding event;
   computing the number of bytecodes executed by the thread running in the virtual machine since the preceding event; and
   returning, in response to the request, the number of bytecodes executed by the thread running in the virtual machine since the preceding event, wherein the step of computing the number of bytecodes executed by the thread running in the virtual machine since the preceding event further includes:
   retrieving a stored bytecode count for the thread;
   obtaining a current bytecode count for the thread;
   computing a difference between the current bytecode count and the stored bytecode count; and
   adding the computed difference to the number of bytecodes executed by the thread running in the virtual machine sine the preceding event.

2. The method of claim 1 further comprising:
   storing the current bytecode count for subsequent retrieval.

3. A data processing system for processing events detected while profiling an instrumented program executed by a virtual machine in the data processing system, the data processing system comprising:
   receiving means for receiving, in response to an occurrence of a current event, a request for a number of bytecodes executed by a thread running in the virtual machine since a preceding event;
   first computing means for computing the number of bytecodes executed by the thread running in the virtual machine since the preceding event, and
   returning means for returning, in response to the request, the number of bytecodes executed by the thread running in the virtual machine since the preceding event, wherein the first computing means further includes:
   retrieving means for retrieving a stored bytecode count for the thread;
   obtaining means for obtaining a current bytecode count for the thread;
   second computing means for computing a difference between the current bytecode count and the stored bytecode count; and
   adding means for adding the computed difference to the number of bytecodes executed by the thread running in the virtual machine since the preceding event.

4. The data processing system of claim 3 further comprising:
   storing means for storing the current bytecode count for subsequent retrieval.

5. The data processing system of claim 3 further comprising applying means for applying, in response to a determination of completion of the profiling the instrumented program, remaining bytecode counts to corresponding threads.

6. A computer program product in a computer-readable medium for use in a data processing system for processing events detected while profiling an instrumented program executed by a virtual machine in the data processing system, the computer program product comprising:
   first instructions for receiving, in response to an occurrence of a current event, a request for a number of bytecodes executed by a thread running in the virtual machine since a preceding event;
   second instructions for computing the number of bytecodes executed by the thread running in the virtual machine since the preceding event; and
   third instructions for returning, in response to the request, the number of bytecodes executed by the thread running in the virtual machine since the preceding event, wherein the second instructions further include:
   instructions for retrieving a stored bytecode count for the thread;
   instructions for obtaining a current bytecode count for the thread;
   instructions for computing a difference between the current bytecode count and the stored bytecode count; and
   instructions for adding the computed difference to the number of bytecodes executed by the thread running in the virtual machine since the preceding event.

7. The computer program product of claim 6 further comprising:
   instructions for storing the current bytecode count for subsequent retrieval.

* * * * *

UNITED STATES PATENT AND TRADEMARK OFFICE
CERTIFICATE OF CORRECTION

PATENT NO.   : 6,539,339 B1  
DATED        : March 25, 2003  
INVENTOR(S)  : Berry et al.

It is certified that error appears in the above-identified patent and that said Letters Patent is hereby corrected as shown below:

Column 1,  
Line 37, after "TRACE", delete ",".  
Line 43, after "even", delete "dale" and insert -- date --.

Column 4,  
Line 44, after "are", delete "table" and insert -- tables --.

Column 25,  
Line 50, after "profiling", delete "all" and insert -- an --.  
Line 52, after "computer-implemented" delete "stops" and insert -- steps --.  
Line 53, after "of" insert -- a --.  
Line 71, after "machine", delete "sine" and insert -- since --.

Column 26,  
Line 14, after "event", delete "," and insert -- ; --.

Signed and Sealed this

Second Day of March, 2004

JON W. DUDAS  
*Acting Director of the United States Patent and Trademark Office*